United States Patent
Kurotsu

(10) Patent No.: US 7,916,315 B2
(45) Date of Patent: Mar. 29, 2011

(54) METHOD AND APPARATUS FOR EXECUTING LOAD DISTRIBUTED PRINTING

(75) Inventor: Noriyoshi Kurotsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1552 days.

(21) Appl. No.: 10/999,922

(22) Filed: Dec. 1, 2004

(65) Prior Publication Data

US 2005/0128512 A1    Jun. 16, 2005

(30) Foreign Application Priority Data

Dec. 15, 2003    (JP) .................. 2003-416617

(51) Int. Cl.
*G06F 3/12* (2006.01)
*G06F 3/00* (2006.01)

(52) U.S. Cl. ...... 358/1.14; 358/1.1; 358/1.13; 358/1.15; 710/54

(58) Field of Classification Search ................. 358/1.1, 358/1.13, 1.14, 1.15; 710/54
See application file for complete search history.

(56) References Cited

U.S. PATENT DOCUMENTS

| | | | | |
|---|---|---|---|---|
| 6,466,326 B1 * | 10/2002 | Shima | ................. | 358/1.12 |
| 6,809,831 B1 * | 10/2004 | Minari | ................. | 358/1.15 |
| 7,148,991 B2 * | 12/2006 | Suzuki et al. | ................. | 358/1.5 |
| 2004/0001215 A1 | 1/2004 | Kurotsu | ................. | 358/1.13 |
| 2005/0128505 A1 | 6/2005 | Shirai et al. | ................. | 358/1.14 |
| 2005/0141013 A1 | 6/2005 | Kikuchi et al. | ................. | 358/1.14 |
| 2005/0141023 A1 | 6/2005 | Yagita et al. | ................. | 358/1.15 |

FOREIGN PATENT DOCUMENTS

JP    6-259206    9/1994

* cited by examiner

*Primary Examiner* — King Y Poon
*Assistant Examiner* — Lawrence E Wills
(74) *Attorney, Agent, or Firm* — Fitzpatrick, Cella, Harper & Scinto

(57) ABSTRACT

There is disclosed a system which efficiently and effectively executes printing even when an error occurs in a printing apparatus. An apparatus according to the present invention is an information processing apparatus which includes a plurality of print queues corresponding to a plurality of printing apparatuses, comprising registration means for registering, in the plurality of print queues, job information including information which can link to print data, and means for excluding, from schedule-up targets, job information except job information scheduled up first in accordance with a vacant state of the print queues, and when interruption of printing has occurred in a printing apparatus which has output a print job based on the job information scheduled up, setting the job information excluded from the schedule-up targets as a schedule-up target.

9 Claims, 23 Drawing Sheets

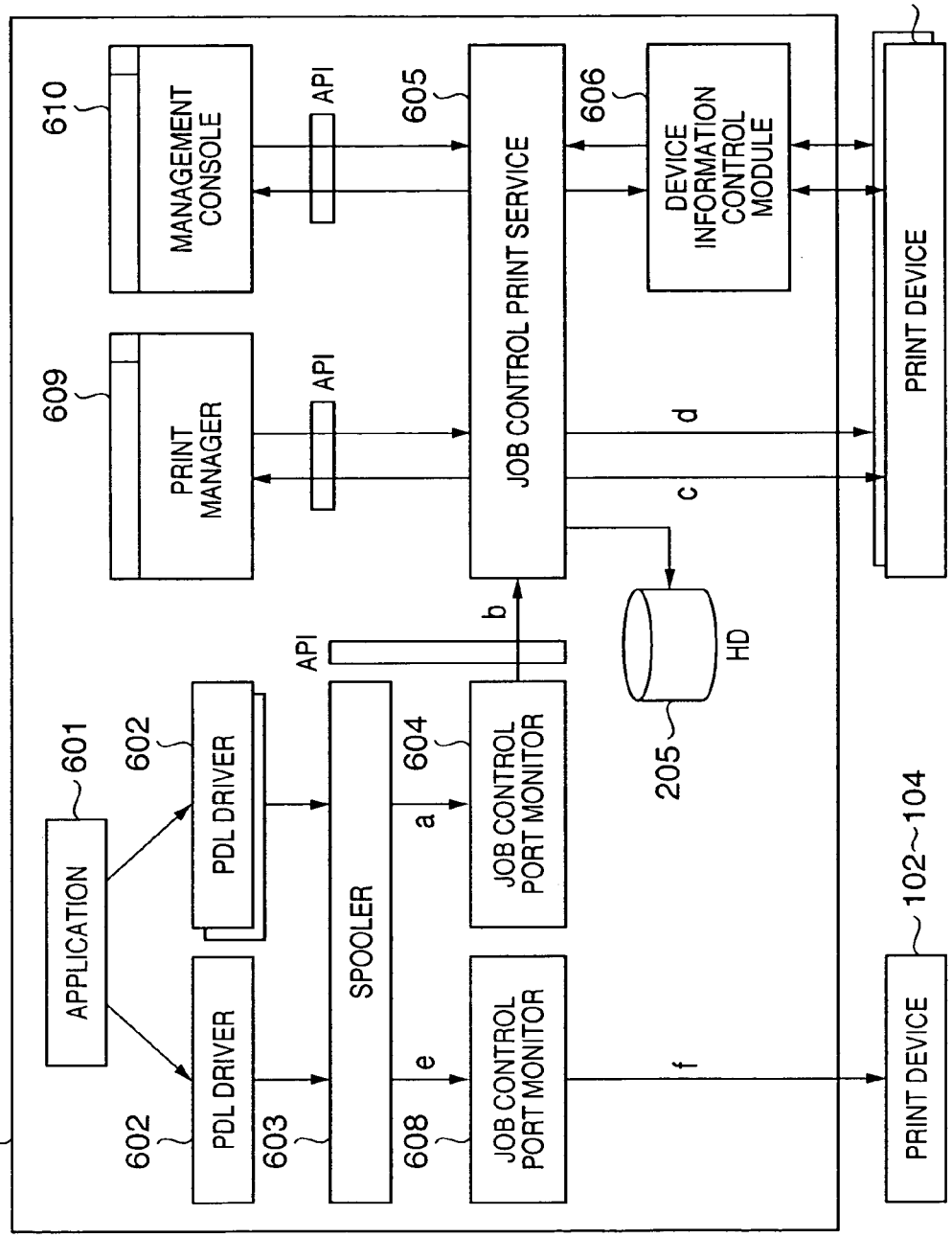

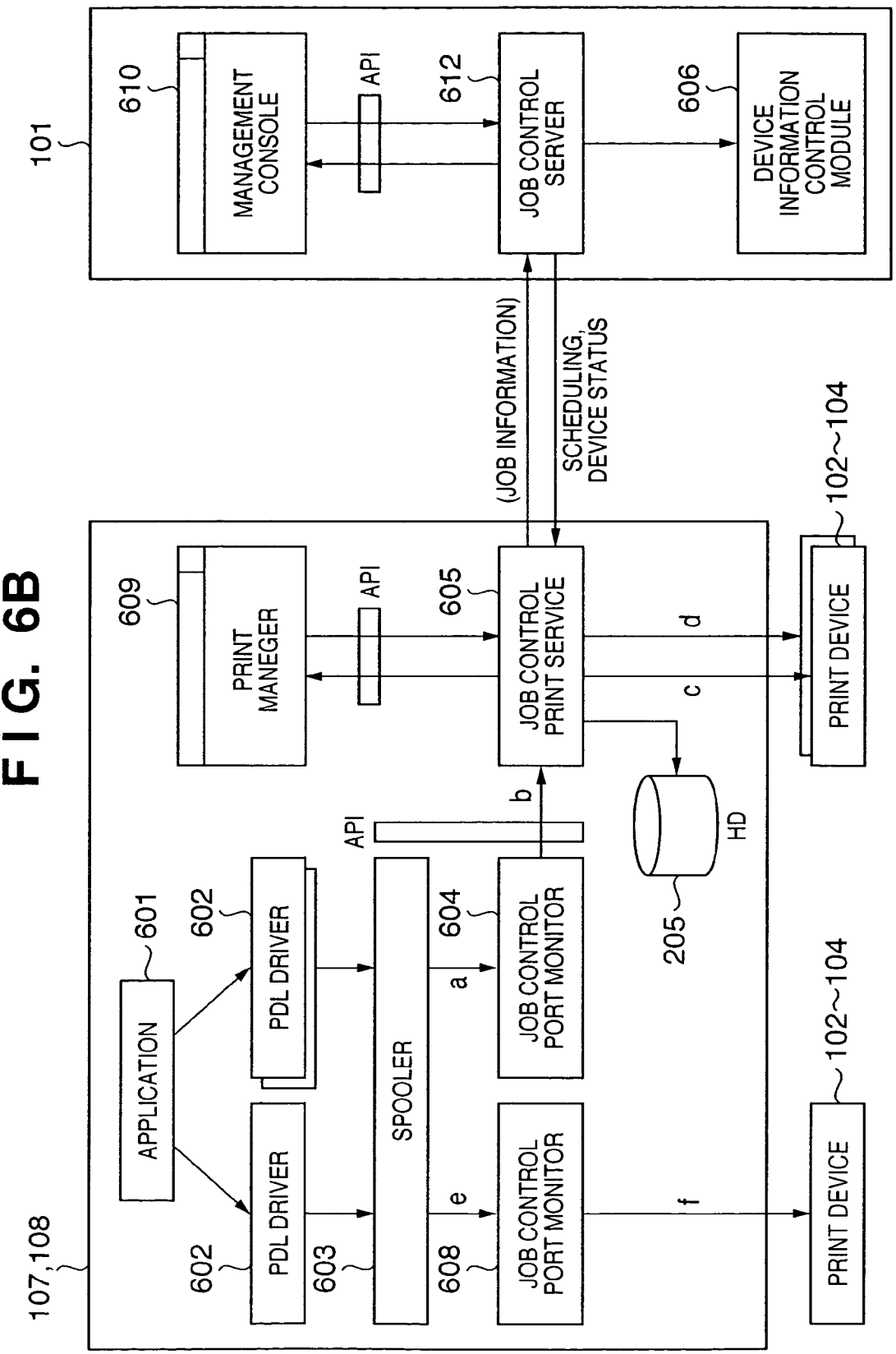

| PRINTER NAME |
| --- |
| PRINTER DRIVER NAME |
| PRINT TYPE |
| BACKUP PRINTER NAME 1 |
| BACKUP PRINTER NAME 2 |
| ⋮ |
| BACKUP PRINTER NAME X |
| ⋮ |
| ⋮ |

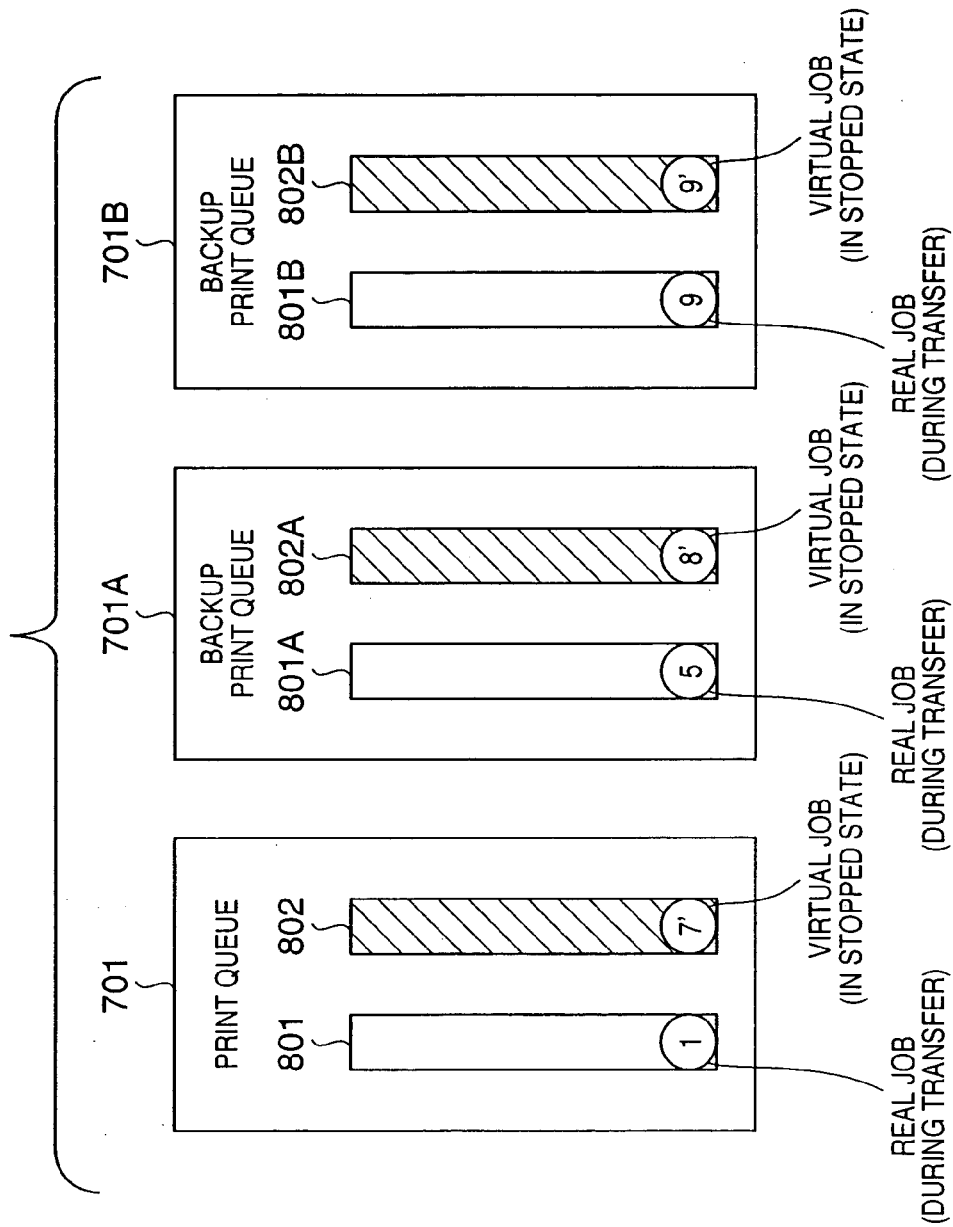

FIG. 18

| ADD PRINTER | ☒ |
|---|---|

PRINTER NAME: [_____] ~1801

PORT NAME: [_____]

1806 ~ [ SELECT PORT... ] [ PROPERTY ]

DRIVER NAME: [_____] ~1802

OUTPUT METHOD: [AUTOMATIC "REDIRECT ON ERROR" PRINT ▼] ~1803  [ SELECT DRIVER ]

BACKUP PRINTER LIST:

[_____] ~1804

1805
[ SET BACKUP PRINTER... ]

─ PRINTER OPTIONS ──────────────

JOB PRIORITY: [   1  ▲▼] (1~99)

CONDITION FOR "REDIRECT ON ERROR" PRINT:
- [✓] ERROR
- [ ] PORT UNUSABLE
- [ ] NUMBER OF JOBS IN PRINT QUEUE  [   ] PIECES OR MORE
- [ ] SIZE OF JOBS IN PRINT QUEUE    [   ] KB OR MORE

CONDITION FOR SWITCHING TO MANUAL "REDIRECT ON ERROR" PRINT:
- [ ] PAPER OUT
- [ ] PAPER JAM
- [ ] COVER/DOOR OPEN
- [ ] FULL LOAD ON TRAY
- [ ] START JOB IN DEVICE

[ OK ] [ CANCEL ] [ HELP (H) ]

METHOD AND APPARATUS FOR EXECUTING LOAD DISTRIBUTED PRINTING

FIELD OF THE INVENTION

The present invention relates to a print processing technique to make efficient use of a plurality of printing apparatuses.

BACKGROUND OF THE INVENTION

Conventionally, there exist load distributed printing systems which distribute a printing load among a plurality of inexpensive medium-speed printing apparatuses and cause them to operate in parallel to implement high-speed printing at a low cost instead of executing mass printing by using one high-speed mass printing apparatus, when it is necessary to print documents in a large quantity.

When a plurality of printing apparatuses are operated in parallel, the load concentrates at a specific printing apparatus. To solve this problem, various techniques to make efficient use of a plurality of printing apparatuses have been proposed (Japanese Patent Laid-Open No. 06-259206).

However, the conventional print system represented by Japanese Patent Laid-Open No. 06-259206 does not consider a case in which, after a print job is transmitted to a printing apparatus, an error occurs in the printing apparatus. In addition, if an error occurs in a print device, a print job which has already been output to the print device is not printed until recovery of the print device is effected by the operator. If another device is executing automatic "redirect on error" printing, the sequence of printing is not guaranteed.

SUMMARY OF THE INVENTION

The present invention has been made to solve the above-described conventional problems, and executes efficient and effective printing even when an error occurs in a printing apparatus.

An apparatus according to the present invention is an information processing apparatus which includes a plurality of print queues corresponding to a plurality of printing apparatuses, comprising registration means for registering, in the plurality of print queues, job information including information which can link to print data, and means for excluding, from schedule-up targets, job information other than job information scheduled up first in accordance with a vacant state of the print queues, and when interruption of printing has occurred in a printing apparatus which has output a print job based on the job information that has been scheduled up, setting the job information excluded from the schedule-up targets as a schedule-up target.

Other features and advantages of the present invention will be apparent from the following description taken in conjunction with the accompanying drawings, in which like reference characters designate the same or similar parts throughout the figures thereof.

BRIEF DESCRIPTION OF THE DRAWING

The accompanying drawings, which are incorporated in and constitute a part of the specification, illustrate embodiments of the invention and, together with the description, serve to explain the principles of the invention.

FIG. 6A is a block diagram showing an example of the software configuration of the print system;

FIG. 6B is a block diagram showing another example of the software configuration of the print system;

FIG. 9 is a view showing the contents of print queue information;

FIG. 17 is a view showing the relation between the real job, real job queue, virtual job queue, print queue, and backup print queue; and FIG. 18 is a view showing an example of a window to set information about the printer;

DETAILED DESCRIPTION OF THE PREFERRED EMBODIMENTS

Figure 1:
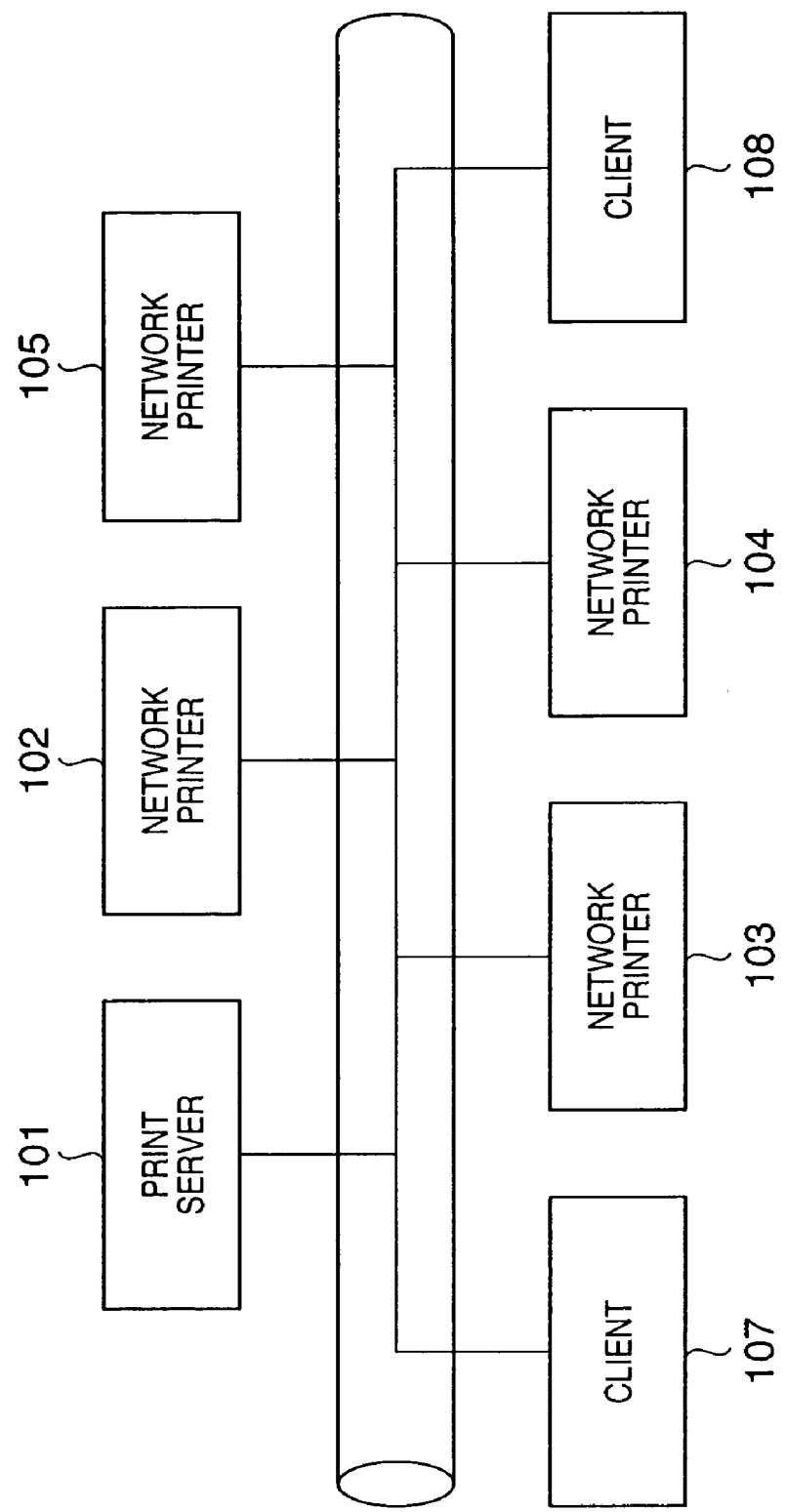
FIG. 1 is a block diagram showing the overall configuration of a print system according to the embodiment of the present invention.

Preferred embodiments of the present invention will now be described in detail with reference to the drawings. It should be noted that the relative arrangement of the components, the numerical expressions and the numerical values set forth in these embodiments do not limit the scope of the present invention unless it is specifically stated otherwise.

In this specification, print data is image data described in PDL or the like. Print job information is information about the printer to which print data should be output, print data storage location (link information), and printing method. A print job is a combination of print data and print job information.

First Embodiment

<Outline>

A print system according to this embodiment has no shared print queue but only print queues corresponding to print devices, unlike the system disclosed in Japanese Patent Laid-Open No. 06-259206. One of the print queues corresponding to a plurality of print devices is set as a basic print queue. The remaining print queues are set as backup print queues. In this embodiment, a print device corresponding to the basic print queue will be referred to as a "basic print device". A print device corresponding to a backup print queue will be referred to as a "backup print device".

The print job information of a print job generated by a printer driver is preferentially registered in the basic print queue. At the same time, job information as a backup of the print job information is generated in each backup print queue. In this embodiment, the backup job information corresponding to the print job information will be referred to as "virtual job information". Normal print job information which does not aim at backup will be referred to as real job information for comparison. Real job information contains a print data storage location (link information). A virtual job is not directly related to print data and contains identification information (real job ID) of real job information. Hence, real job information can be derived from virtual job information.

All print queues including backup print queues can conceptually be classified into queues ("real job queues") for real job information and queues ("virtual job queues") for virtual job information. When a user refers to the print queues by a general method to confirm the states of print jobs, the virtual job queues are not displayed on the user interface. Only the real job queues are displayed. Hence, the user can normally recognize only the state of the real job information.

When a normal print instruction rather than a load distributed print instruction is input, real job information containing the contents of the print instruction is registered in the real job queue in a print queue corresponding to the print instruction. The real job information in the real job queue is output to a print device in accordance with the registration order. Print data stored at the storage location (link information) contained in the real job information is output to the corresponding print device. When the print data is printed by the print device, the corresponding real job information is deleted from the real job queue. Other real job information, registered next, is output. Setting print job information as an output start target to a print device will be referred to as "scheduling up print job information" hereinafter.

On the other hand, when a load-distributed-printing instruction is input, print job information linked to print data is registered in a plurality of print queues. More specifically, print job information contained in the print instruction is registered, as real job information, in the real job queue in the print queue corresponding to the logical printer designated by the instruction. Virtual job information corresponding to the real job information is registered in the virtual job queue in the same print queue. Similarly, virtual job information corresponding to the real job information is registered in the virtual job queues in all the remaining backup print queues.

Assume that before all pieces of previously-registered real job information are output to the print device corresponding to the print queue in the real job queue in the print queues, the real job queue in one of the backup print queues is vacant. In this case, the virtual job information registered in the virtual job queue in the backup print queue is scheduled up. Real job information corresponding to the virtual job information scheduled up is generated in the real job queue in the backup print queue. The contents of the original real job information are copied to the newly generated real job information, and the original real job information is deleted. In addition, print data stored at the storage location (link information) contained in the new real job information is transmitted to the print device. When printing by the print device is ended, and the system is notified of that fact, all pieces of real job information and virtual job information corresponding to the printed print job are deleted. In this embodiment, when real job information is registered in the basic print queue in accordance with the load distributed print instruction, virtual job information is also registered in the same basic print queue. Instead, virtual job information may be registered in the same print queue when the original real job information is deleted, as described above.

That is, print job information corresponding to load distributed printing is temporarily registered in the basic print queue and then transmitted to a print device which is set in the printable state at the earliest timing. Hence, load distributed printing can efficiently be performed without redundantly registering a plurality of identical print data.

In the user interface to browse job information registered in the print queue, when a load-distributed-printing instruction is input, an object indicating print job information appears in the basic print queue of the load distributed print device. After that, it looks as if the print job information has moved to the print queue of the backup print device which is set first in the printable state to start printing. That is, the user is not confused because only one object of the print job corresponding to one print data is displayed.

Assume that after print data is transmitted to a print device by the above-described load distributed printing, an event (e.g., an error) that does not allow the print device to print occurs in it. In this case, pieces of virtual job information remain in the virtual job queues of all print devices (basic print device and backup print devices), including the print device with the error. Assume that before the print device recovers from the error, virtual job information is scheduled up in one of the remaining print queues. In this case, new real job information corresponding to the virtual job information that has been scheduled up is registered in the real job queue, and the original real job information is deleted. Print data stored at the storage location (link information) contained in the new real job information is transmitted to a print device corresponding to the print queue in which the new real job queue is registered. If the print device recovers from the error before the scheduling up of virtual job information in the remaining print queues, printing is resumed by the print device which has recovered. When printing by the print device which has recovered is ended, and the system is notified of that fact, all pieces of real job information and virtual job information corresponding to the printed print job are deleted.

That is, when an error occurs in a print device, the print data whose output is interrupted is output to that one of all the print devices, including the print device with the error, which can print the print data at the earliest timing from the error occurrence. "Redirect on error" printing after the error is done on the basis of virtual job information registered when the load distributed print instruction is input. For this reason, even when the job information is not registered in the print queue from the start, the correct sequence of printing is guaranteed even in the case of an error.

<System Configuration>

FIG. 1 is a block diagram showing the overall configuration of the print system according to the embodiment of the present invention. This print system includes a print server 101 serving as an information processing apparatus, network printers 102 to 105 serving as printing apparatuses (print devices), and clients (computers) 107 and 108. These components are connected to each other to form a network.

An executable print control program is stored in the print server 101. The print server 101 has a function of storing files to be used in the network and a function of monitoring the use state of the network as well as a function of managing the network printers 102 to 105 included in the print system. More specifically, the print server 101 has a function of creating a print job by itself and transferring it to the network printers 102 to 105, a function of receiving print data generated by the client 107, generating a print job containing the print data, and transferring it to the network printers 102 to 105 by scheduling processing, and a function of executing scheduling processing for a print job generated by the client 107 or 108 and spooled in it and instructing the client 107 or 108 to transfer the print job directly to the network printers 102 to 105. The print server 101 need not always be a computer specialized to printer management. A general-purpose computer having a printer management function can be used. The print server 101 may function as a client in relation to the remaining computer.

The network printers 102 to 105 are print devices serving as physical apparatuses which receive a print job containing print data from the print server 101 or client 107, analyze the received print job, and execute printing. As the network printers 102 to 105, all kinds of printing apparatuses including a laser beam printer using electrophotography, an inkjet printer using an inkjet system, and a printer using a thermal transfer system can be employed.

The clients 107 and 108 are computers which function as clients in relation to the print server 101.

Communication between the apparatuses included in this print system may be either wired communication using an Ethernet (registered trademark) cable or wireless communication using radio wave or light.

<Arrangement of Print Server and Clients>

Figure 2:
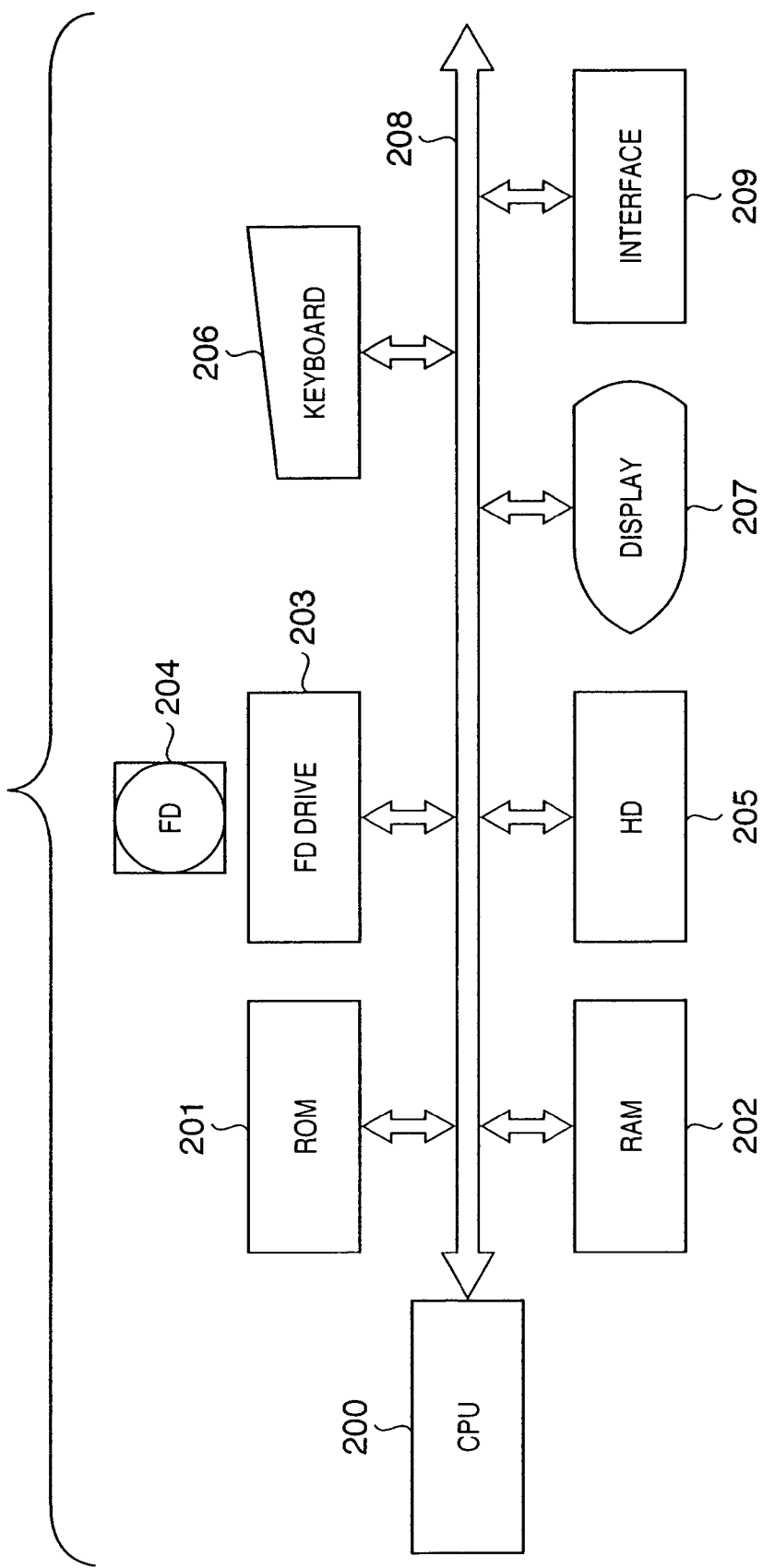
FIG. 2 is a block diagram for explaining the hardware configuration of a server or a client.

FIG. 2 is a block diagram for explaining the hardware configuration of the server 101 and clients 107 and 108 shown in FIG. 1. The print server 101 and clients 107 and 108 have no special difference in hardware configuration. As a representative, the arrangement of the print server 101 will be described.

Referring to FIG. 2, a CPU 200 is a control means for reading out and executing an application program, printer driver program, OS, and print control program stored in an HD (Hard Disk) 205 and temporarily storing information and files necessary for execution of the programs in a RAM 202.

A ROM 201 is a storage means for storing various kinds of data such as programs including basic I/O programs, font data to be used for document processing, and template data. The RAM 202 is a temporary storage means which functions as the main memory or work area of the CPU 200.

Figure 5:
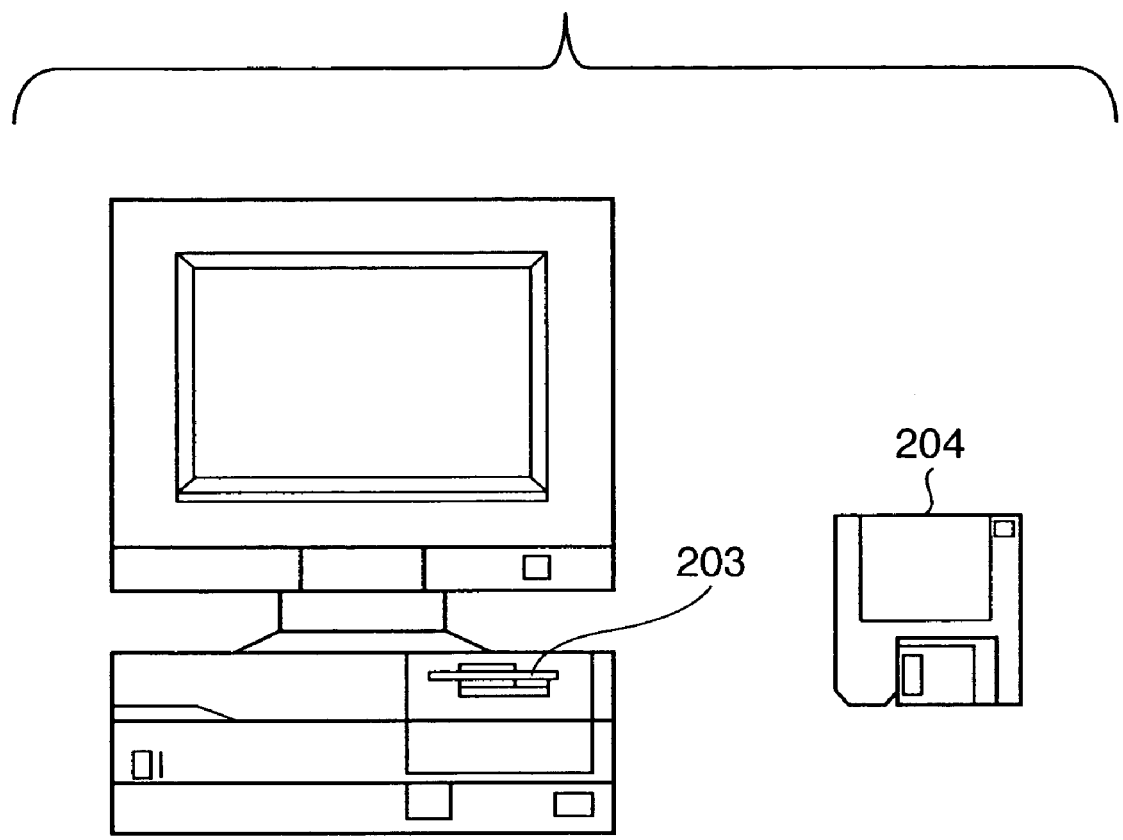
FIG. 5 is a view showing the relationship between an FD drive 203 shown in FIG. 2 and the FD 204 inserted in it.

An FD (Floppy (registered trademark) Disk) drive 203 is a storage medium loading means for loading a program stored in an FD 204 serving as a storage medium to the computer system, as shown in FIG. 5 (to be described later). The print server 101 or client 107 or 108 may have another storage medium loading means in place of or together with the FD drive 203. As another storage medium, any kind of computer-readable storage medium such as a CD-ROM, CD-R, CD-RW, PC card, DVD, IC memory card MO, or memory stick can be used.

The HD 205 is an external storage means which functions as a bulk storage and stores application programs, printer driver program, OS, print control program, and related programs. A spooler serving as a spool means is ensured in the HD 205. In the print server 101, a server spooler is ensured as a spool means. In the client, a client spooler is ensured as a spool means.

A keyboard 206 is an instruction input means from which the user inputs instructions such as a device control command to the print server 101 or client 107 or 108.

A display 207 is a display means for displaying a command input from the keyboard 206 or the states of the printers 102 to 105. Actually, a display instruction is input to the display means through the operating system running on the print server 101 or client 107 or 108. The print processing program inputs a resource file display instruction to the operating system. Accordingly, display to be described later is performed. A system bus 208 controls the data flow in the computer, i.e., the print server 101 or client 107 or 108.

An interface 209 is an input/output means. The print server 101 or client 107 or 108 transmits/receives data to/from another apparatus on the network through the interface 209.

<Description of Memory Map>

Figure 3:
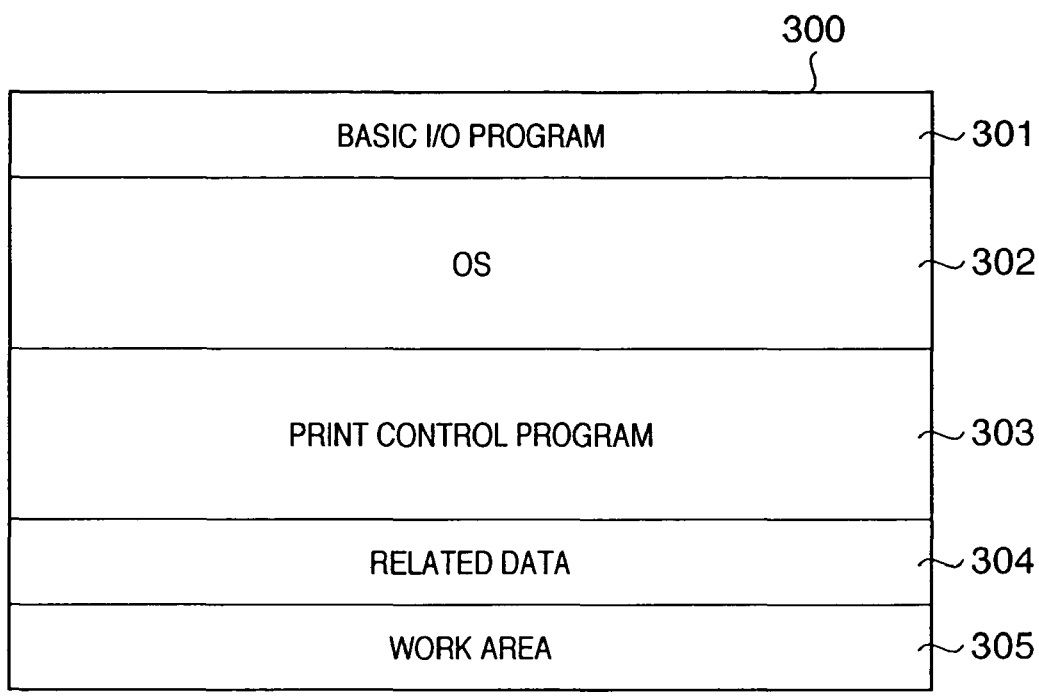
FIG. 3 is a view showing an example of the memory map of a RAM 202 shown in FIG. 2.

FIG. 3 is a view showing an example of the memory map of the RAM 202 shown in FIG. 2. In this memory map state, the print control program is loaded to the RAM 202 and becomes executable. FIG. 5 is a view showing the relationship between the FD drive 203 shown in FIG. 2 and the FD 204 inserted in it. The same reference numerals as in FIG. 2 denote the same parts in FIG. 5. Referring to FIG. 5, the FD 204 stores the print control program and related data.

The print control program and related data may be installed from the FD 204 to the HD 205 in advance and then loaded from the HD 205 to the RAM 202. Alternatively, they may be loaded directly from the FD 204 to the RAM 202 and executed. The print control program may be stored in the ROM 201 as part of the memory map and executed directly by the CPU 200. Software products which implement the same functions as the above-described devices may be used in place of the hardware devices.

In the client, the print control program executes control to instruct a change of a print job printing destination or a change of the sequence of printing. In the print server, the print control program controls the sequence of print jobs or notifies the user of the end of printing of a print job or a printing destination change request. The print control program may separately contain a module to be installed in the client and a module to be installed in the print server. Alternatively, a single print control program may function as a program for the client or a program for print server in accordance with the environment where the program is executed. Both the module having the function for the client and the module which functions for the print server may be installed in one computer and perform pseudo-parallel operations simultaneously or time-divisionally.

An area 301 stores the basic I/O program. The basic I/O program has, e.g., an IPL (Initial Program Loading) function of loading the OS from the HD 205 to the RAM 202 upon power-on of the apparatus (print server 101 or client 107 or 108) and starting the operation of the OS.

An area 302 stores the OS (Operating System). An area 303 stores the print control program. An area 304 stores related data. A work area 305 is an area where the CPU 200 executes various kinds of programs.

Figure 4:
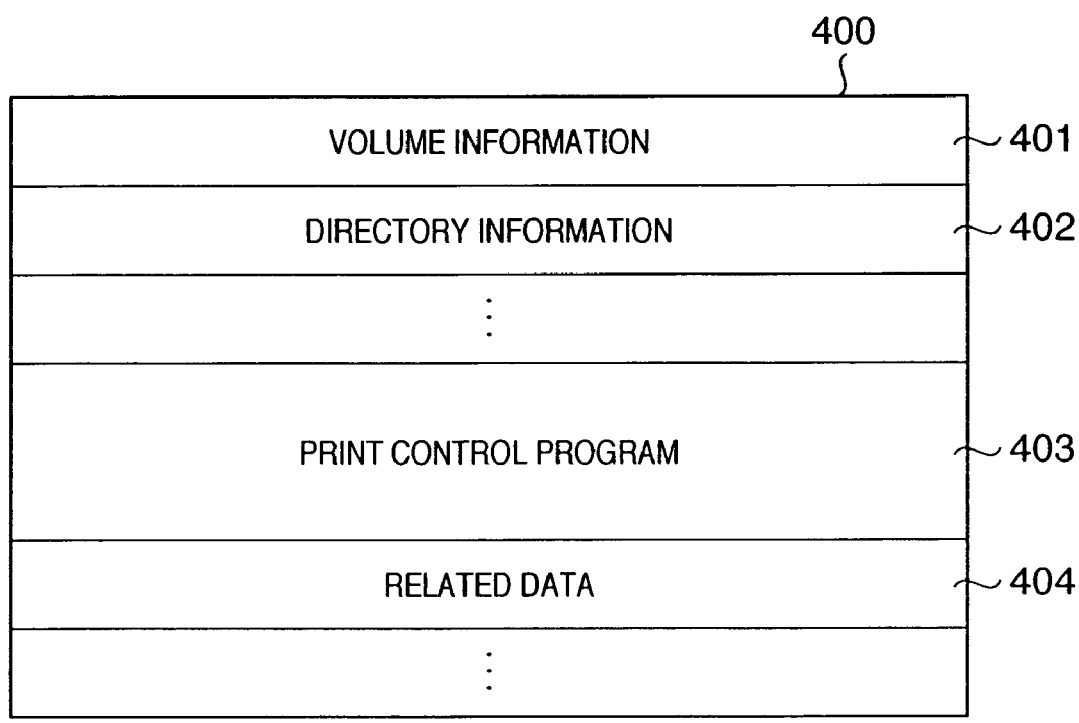
FIG. 4 is a view showing an example of the memory map of an FD 204 shown in FIG. 2.

FIG. 4 is a view showing an example of the memory map of the FD 204 shown in FIG. 2. Referring to FIG. 4, data contents 400 of the FD 204 contain volume information 401 representing the information of data, directory information 402, print control program 403, and related data 404.

<Software Configuration of Print System>

The software configuration of the print system will be described next. FIG. 6A is a block diagram showing an example of the software configuration of the print server 101 or client 107 or 108. Arrows between the components indicate how to process a print job containing a rendering command issued from an application. Software configuration indicated by each block is executed by the CPU 200 shown in FIG. 2 to implement a desired function.

Normally, upon receiving a print instruction, a general application program 601 such as Microsoft Word (registered trademark) generates a series of rendering commands through the OS. A PDL driver 602 receives the rendering commands generated through the OS and generates, on the basis of the series of rendering commands, a print job containing a PDL file which can be interpreted by the network printers 102 to 104. The following description will be done by using the PDL driver as an example. However, the present invention is not limited to this and can also be applied to a printer driver which creates BDL (Band Description Language) or compressed bitmap data or a form which causes an application and OS to generate print data without intervening any printer driver.

The PDL driver 602 transfers the generated print job to a spooler 603 to transmit the print job not to a job control port monitor 608 prepared by the OS for print job transmission to a print device but to a job control port monitor 604. The job control port monitor 604 is a module necessary for causing a job control print service 605 to receive the print job. The job control port monitor 608 is a module which transfers print data not to the job control print service but to the print device and is incorporated in the OS. When a print job is output to the job control port monitor 608, the job is not transferred to the job control print service. Instead, the print job is directly transferred to the print device.

In this example, the OS is assumed to be Windows (registered trademark). Hence, the spooler 603 is a Windows spooler. However, the OS of the computer to which the present invention is applied is not limited to Windows. The present invention can also be applied to any other OS having rendering commands, as a matter of course.

The spooler 603 executes procedures of transferring the print job to the port monitor 604 or 608 selected and designated by the user through the user interface and causing the port monitor to transmit the print job to the print devices such as the network printers 102 to 104 (arrow a). In the following description, assume that the user designates the load-distributed-printing port monitor 604 (to be referred to as a job control port monitor hereinafter) in advance and instructs printing.

Pieces of print setting information such as the paper size and staple instruction set through the printer driver interface are also transmitted to the job control port monitor 604.

The job control port monitor 604 transmits the print job to the load-distributed-printing print service 605 (to be referred to as a "job control print service" hereinafter) (arrow b) instead of directly transmitting the print job to the print devices 102 to 104.

The job control print service 605 has a function of managing the transferred print job and device states. Especially when a print device and data transfer source are connected peer-to-peer to output a print job directly to the print device, the job control print service 605 has a function of managing information such as a device state or a job state notification from the print device or sending a predetermined instruction to the print device. This corresponds to a function of managing the device information or job information of the plurality of network printers 102 to 104. The job control print service 605 transfers a print job whose turn has come to the network printers 102 to 104 on the basis of the print job sequence management function (load-distributed-printing function) (arrows c and d).

The print job sequence management function implemented by the job control print service 605 will be described here in detail. The sequence management function includes the following functions:

A print queue setting function of setting, of a plurality of print queues corresponding to a plurality of print devices, print queues other than those corresponding to print devices set for load distributed printing as backup print queues.

A print job registration function of registering print job information transferred from the job control port monitor 604 in a load-distributed-printing print queue (basic print queue) and a backup job registration function of generating backup job information corresponding to the print job information registered in the load-distributed-printing print queue and registering the backup job information in a backup print queue.

A job control function of managing each of the load-distributed-printing print queues and backup print queues, for a print queue in which print job information has been registered, preferentially scheduling up the print job information (transmitting print data corresponding to the print job information to the print device corresponding to the print queue), and for a print queue in which no print job information but only backup job information is registered, changing the backup job information to print job information and transmitting print data to a corresponding print device.

A delete function of, when one of several pieces of registered print job information and corresponding backup job information in the load-distributed-printing print queues and backup print queues is transmitted to a print device, deleting pieces of print job information which have not been transmitted and corresponding backup job information from all print queues.

A print manager 609 is a program which provides a user interface through which the user checks the state of a print job in the job control print service 605 or operates the print job. The print manager 609 transmits/receives information and instructions to/from the job control print service 605 via the software interface (API: Application Program Interface) of the job control print service 605.

The print manager 609 has a function of acquiring, as an event, the state information of the network printers 102 to 104 managed by the job control print service 605. Assumed event notifications are error/warning information notifications such as toner level warning, communication error between the client and device, memory shortage, and full load on the paper output tray, and normal information notifications such as a return from an error state to a normal state. In this case, the job control print service 605 has a function of monitoring statuses such as the power control state and error information (paper jam) during printing execution by each print device communicable through the network.

As more detailed processing, the print manager 609 issues an event with a device designated to the job control print service 605. The job control print service 605 monitors the status of the device based on the issued event and notifies the print manager 609 of the monitoring result.

A management console 610 can monitor the whole print server 101 or client 107 or 108 by transmitting/receiving information and instructions to/from the job control print service 605 via an API for access by software.

The job control print service 605 explicitly indicates a function of communicating with the network printers 102 to 104 by using a device information control module 606 and acquiring information about a print job or operation state in each printer. This function may be incorporated in the job control print service 605.

When a print function as the standard equipment of a general operating system is used without executing load distributed printing, a PDL file generated by the PDL driver 602 is transferred from the spooler 603 to the job control port monitor 608 (arrow e) and then to the network printers 102 to 104 (arrow f).

A modification of the system described with reference to FIG. 6A will be described next with reference to FIG. 6B. FIG. 6B shows an example in which the functions necessary for load distributed printing are implemented by causing the client 107 or 108 and server 101 to share the functions in cooperation with each other. More specifically, FIG. 6B shows the flow of data when print server 101 executes scheduling for print job information which is created by the client 107 or 108 and registered in a print queue on the side of the server 101. The same reference numerals as in FIG. 6A denote the same components in FIG. 6B.

In the system shown in FIG. 6B, the client 107 or 108 need not have the management console 610 or device information control module 606. Instead, the server 101 has the management console 610 and device information control module 606, thereby managing the device information of the print devices collectively. The server 101 also has a job control server 612. The print server 101 communicates with the print devices 102 to 104 by using the device information control module 606 to acquire information about a print job or operation state in each printer or execute an operation. The acquired information can be transferred to the job control print service 605 and shared.

The job control server 612 executes concentrated control (scheduling) of print job transmission timings from the job control print service 605 on the client 107 or 108 to the print devices 102 to 104. The job control server 612 basically has the same functions as those of the job control print service 605 and logically shares job information with the job control print service 605. Job information indicates various kinds of attribute information of a print job, including the name of the document to be printed, the ID of the print job, and the name of the printer to which the print job has been output.

That is, the print job sequence management function (load-distributed-printing control function) described with reference to FIG. 6A may be arranged in only the server 101 in FIG. 6B. The job control server 612 notifies the job control print service 605 of the sequence and target print device of output of print jobs which are generated by the client 107 or 108 and temporarily held. The job control print service 605 transfers each print job to the network printers 102 to 104 in accordance with an instruction from the job control server 612.

In the above-described software configuration, in the print system shown in FIG. 6A, the job control port monitor 604, job control print service 605, print manager 609, and management console 610 are contained in the print control program. In the client 107 or 108 shown in FIG. 6B, the job control port monitor 604, job control print service 605, and print manager 609 are contained in the print control program. In the print server 101, the device information control module 606, management console 610, and job control server 612 are contained in the print control program.

The software configuration of the print system is not limited to FIGS. 6A and 6B. The present invention can also be implemented by any other arrangement. For example, the client may have only the components from the application 601 to the job control port monitor 604 while the server 101 may have the job control print service 605, print manager 609, management console 610, and device information control module 606.

<Flow of Print Job>

The flow of a print job from the application 601 to a print device will be described next with reference to FIG. 7. The same reference numerals as in FIG. 6A denote the same software components in FIG. 7, and a detailed description of their functions will be omitted.

Figure 7:
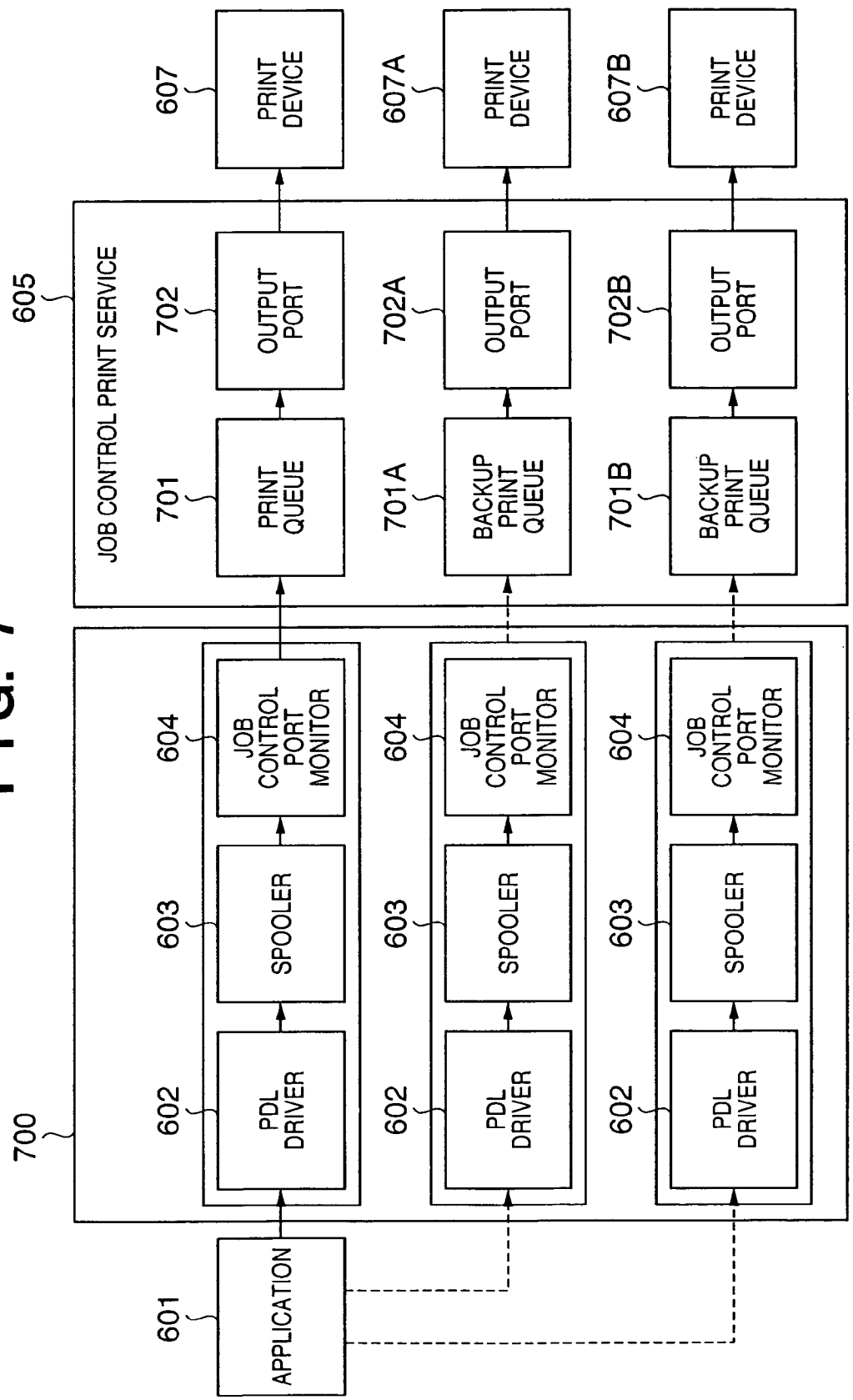
FIG. 7 is a block diagram showing the flow of print jobs in load distributed printing.

As shown in FIG. 7, conceptually, the PDL driver 602, spooler 603, and job control port monitor 604 are prepared for each of the print devices 102 to 104. If the OS is Windows, these components may be called a Windows print system 700 as a whole.

The job control print service 605 includes print queues 701, 701A, and 701B and output ports 702, 702A, and 702B which are equal in number to the print devices 102 to 104. Each output port is associated with the IP address of a corresponding print device or a name (DNS: Domain Name System) used in name resolution. On the basis of the IP address or DNS, the job transmission destination is specified, and job transmission (output) is done. Print queues are classified into one print basic queue 701 to which a predetermined job is output and a plurality of print queues 701A and 701B. In this embodiment, a print queue is set for each print device as a physical apparatus. However, the present invention is not limited to this. A print queue may be set for each logical printer. More specifically, a logical printer is set in correspondence with a plurality of print devices, and one print queue is set for the logical printer. Alternatively, a plurality of logical printers are set in correspondence with one print device, and a print queue is set for each of the plurality of logical printers.

To execute load distributed printing, the application 601 designates a printer having load-distributed-printing setting and issues a print instruction. On the basis of the print instruction, a print job is generated by the PDL driver 602 and transferred from the job control port monitor 604 to the job control print service 605. The print job information is held in the print queue 701. Simultaneously, pieces of virtual job information corresponding to the print job information are generated in the print queues 701A and 701B. One of these print jobs is sent to the print devices 102 to 104. Print devices corresponding to the backup print queues are called backup printers which indicate spare print devices to be used when, e.g., the print device designated by the user is busy.

<Contents of Various Kinds of Information>

I. Real Job Queue and Virtual Job Queue in Print Queue

Figure 8:
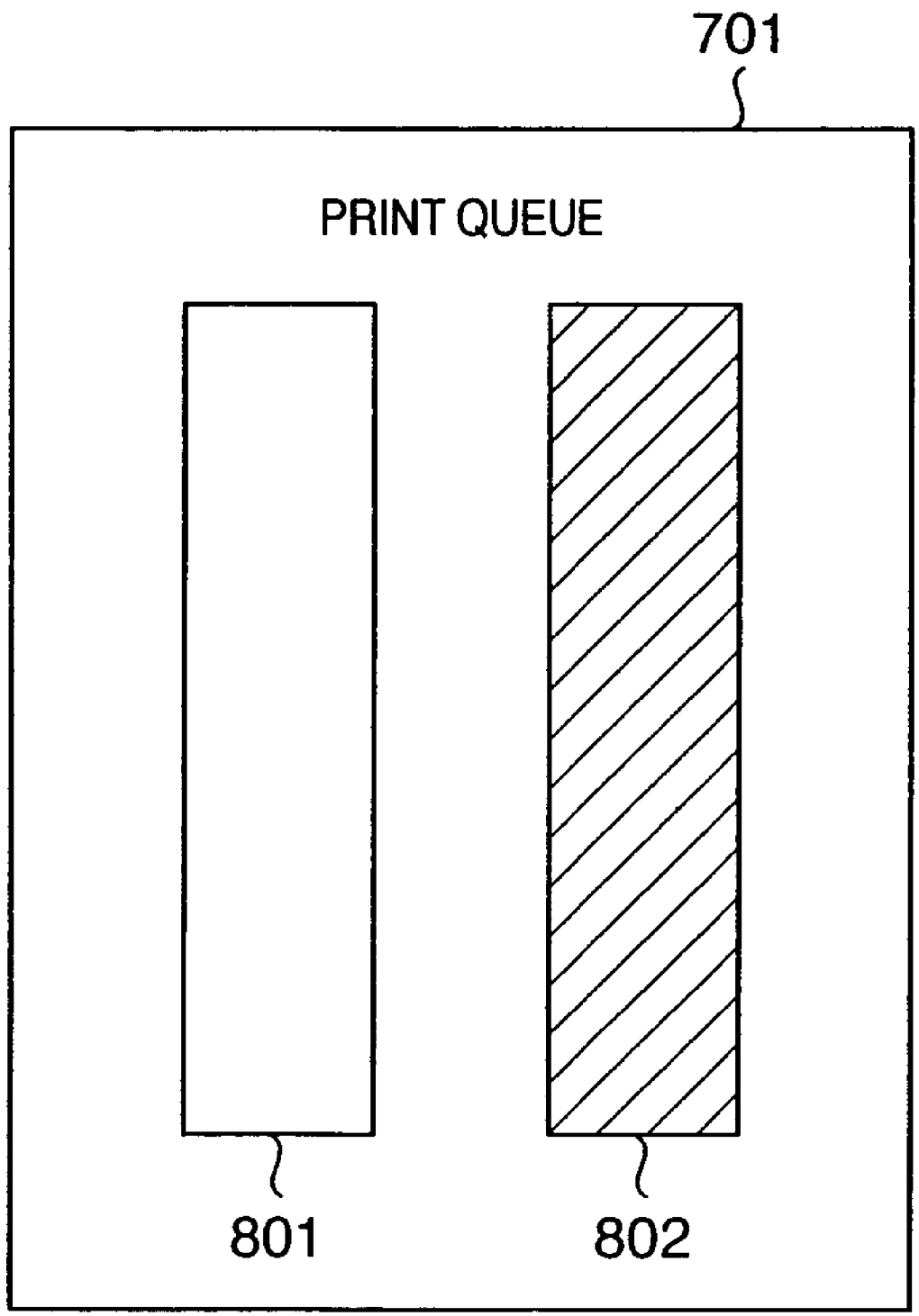
FIG. 8 is a view showing the relation between a print queue, a real job queue, and a virtual job queue.

FIG. 8 is a view showing a real job queue 801 and virtual job queue 802 in the print queue 701. The real job queue and virtual job queue may logically be formed by causing print job information to contain attribute information (1006 or 1103) representing that it is real job information or virtual job information. The real job queue and virtual job queue may be formed as different variables in reality. The real job queue 801 and virtual job queue 802 are queues which manage print job information and are used in load distributed print processing. A print queue containing a real job queue and virtual job queue as shown in FIG. 8 is made to correspond to each logical printer. If one logical printer corresponds to one print device, the print queue shown in FIG. 8 corresponds to a print queue corresponding to a print device. This print queue functions as a basic print queue on one occasion and as a backup print queue on another occasion.

As described above, real job information is print job information which contains no print data itself but a link to print data such as a spool name. The real job information is managed by the real job queue. Virtual job information contains no print data, like the real job information, but link (the ID of real job information) to real job information. Accordingly, information set in the real job information can be used so that the virtual job information is indirectly linked to print data. The virtual job information is managed by the virtual job queue.

II. Print Queue Information

FIG. 9 is a view showing print queue information which determines the operation of the print job received by the print queue 701. The set contents of the print queue information, i.e., "printer name", "printer driver name", "print type", and "backup printer name" will be described. In the system form shown in FIG. 6A, the information shown in FIG. 9 is held by the job control print service 605. In the system form shown in FIG. 6B, the information shown in FIG. 9 is shared by the job control print service 605 and the job control server 612.

"Printer name" indicates the name of a printer object of Windows (registered trademark). Each printer object has a unique name so that each printer object can be identified. Strictly speaking, the "printer name" is a character string which specifies a logical printer. However, the printer name specifies a print device because a physical print device can generally be specified on the basis of a logical printer.

"Printer driver name" is the name of a printer driver set in the printer object. "Print type" is setting which determines the operation of the print job received by the print queue. "Backup printer name" is the name of a printer object (logical printer) as the load distribution destination in load distributed printing.

III. Real Job Information

Figure 10:
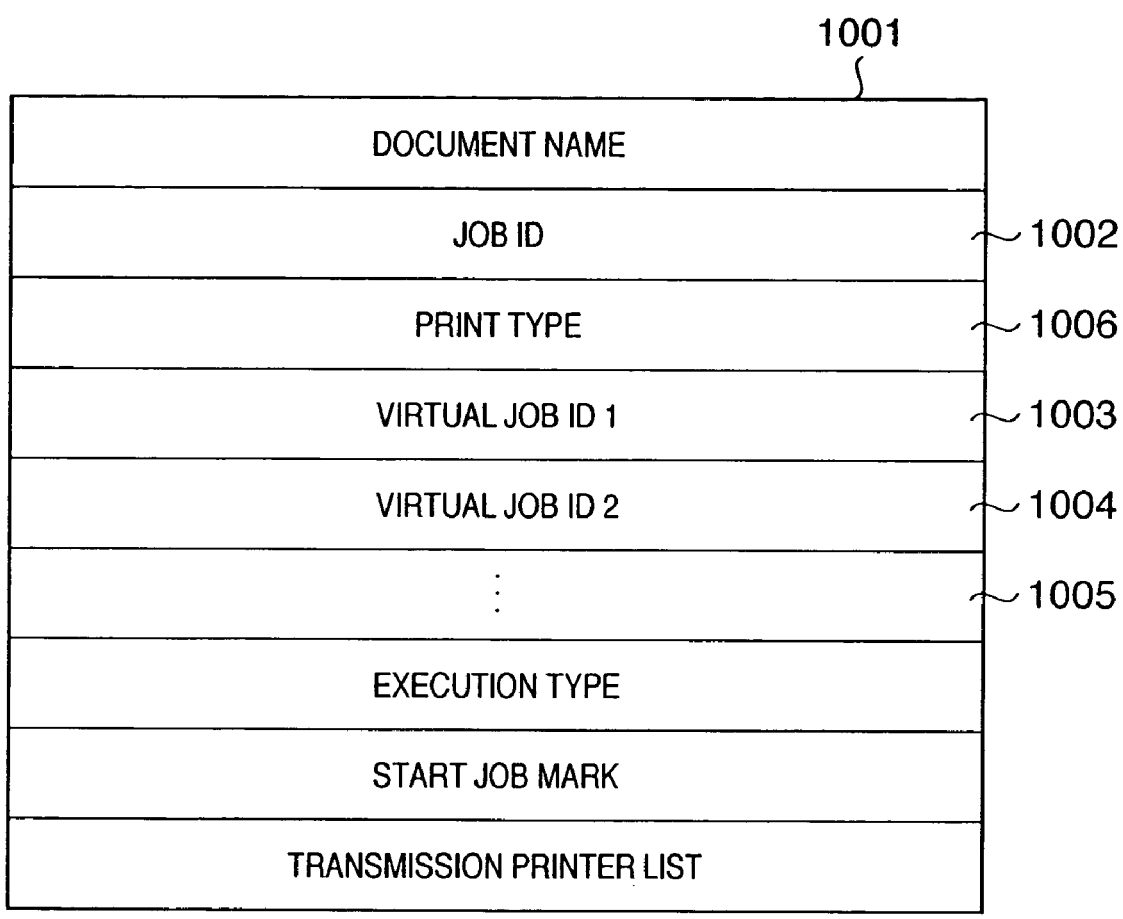
FIG. 10 is a view showing the contents of real job information.

FIG. 10 is a view showing print job information registered in the real job queue in the print queue 701. In the system form shown in FIG. 6A, the information shown in FIG. 10 is held by the job control print service 605, like the information shown in FIG. 9. In the system form shown in FIG. 6B, the information shown in FIG. 10 is shared by the job control print service 605 and the job control server 612. The held real job information is deleted when associated virtual job information is scheduled up, or output of the print job corresponding to the real job information is ended in a printing apparatus.

A real job is a print job containing print data spooled in a predetermined storage area. This print job is sent to the output port, subjected to actual transfer processing, and output by a printer. Real job information is various kinds of setting information contained in the real job and is registered in the print queue 701.

The set contents of the real job information (document name, job ID, print type, execution type, virtual job ID, start job mark, transmission printer list, and spool file name) will be described below.

"Document name" is the name of a job (print data file) to be printed by the application 701.

A job ID 1002 shown in FIG. 10 is an arbitrary ID assigned to each real job information to identify the job. Upon receiving a print job, the print queue 701 assigns a job ID to the job.

A print type 1006 is information which determines the operation of the real job, like the information in FIG. 9. Information such as that the job is load distributed printing is set. Upon receiving real job information, the print queue 701 acquires the information from the print type and sets it in the print type of the real job information. This information also contains an attribute representing that it is real job information.

"Execution type" is information representing the type of the print job. Examples of the type to be set are (1) password input job which inhibits printing unless a password is input in the network printers 102 to 104, (2) encrypted secure job, (3) offline job (which sets an offline state immediately before output by the network printers 102 to 104), (4) save job (which is saved in the HDs of the network printers 102 to 104), and (5) load distributed printing. This item is set when the job type notification is received from the printer driver or application. In some cases, the job type is discriminated and set. This information may be contained in the print type 1006.

A virtual job ID 1003 is the job ID of virtual jobs which are created in executing load distributed print processing. When a plurality of pieces of virtual job information are generated, a plurality of virtual job IDs 1003 to 1005 are set.

"Start job mark" represents the start of print jobs managed by the network printers 102 to 104.

In "transmission printer list", the names of printers to which real jobs are transmitted are set.

"Spool file name" is the name of a spool file corresponding to print data created on the basis of application data and corresponds to the print job storage location (link information). The spool name is used to specify the spool file stored in a predetermined storage portion. A spool file ID may be employed in place of the spool file name. When job output based on real job information is done for a corresponding print device, print data which is specified on the basis of the spool file name related to the real job information is written to the output port so that the print data is output to the print device.

IV. Virtual Job Information

Figure 11:
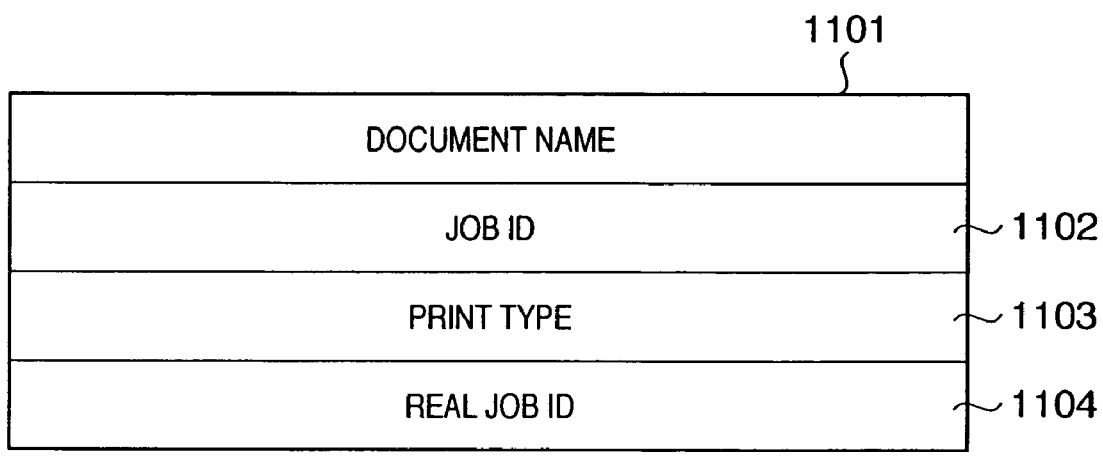
FIG. 11 is a view showing the contents of virtual job information.

FIG. 11 is a view showing virtual job information registered in the virtual job queue in the print queue 701. In the system form shown in FIG. 6A, the information shown in FIG. 11 is held by the job control print service 605, like the information shown in FIGS. 9 and 10. In the system form shown in FIG. 6B, the information shown in FIG. 10 is shared by the job control print service 605 and the job control server 612. As the characteristic feature of virtual job information, it can be identified as virtual job information and is scheduled up with lower priority than real job information. All pieces of information (FIG. 10) contained in real job information may be set in virtual job information. In the following description, however, virtual job information contains minimum and necessary pieces of information as the best mode.

Virtual job information is associated with the real job information for load distribution and is necessary for schedule management in load distributed print processing.

The set contents of the virtual job information, i.e., "document name", "job ID", "print type", and "real job ID" will be described below.

"Document name" is the name of the printing target document of real job information corresponding to the virtual job information and is coped from the real job information in creating the virtual job information.

A job ID 1102 is an ID to identify the virtual job information and is set in creating the virtual job information. The job ID 1102 corresponds to one of the virtual job IDs 1003 to 1005 shown in FIG. 10.

A print type 1103 is the print type of a real job corresponding to the virtual job information and is copied from the print type of the real job information in creating the virtual job. The print type also contains an attribute representing that it is virtual job information in addition to the copied contents.

A real job ID 1104 is the ID of the real job information associated with the virtual job information and set in creating the virtual job information. The real job ID corresponds to the job ID 1102 shown in FIG. 10.

The information shown in FIG. 11 contains no spool file name to specify print data, which has been described with reference to FIG. 10. The spool file name may be contained in the virtual job information in advance, and in changing the real job information (to be described later), the spool file name associated in advance may be used.

<Load Distributed Processing>

In load distributed print processing according to this embodiment, real job information is generated in the basic print queue, and virtual job information is generated in the backup print queues in accordance with the load distributed print setting of the logical printer to which a print instruction is issued from the application. Of the jobs, print data corresponding to print job information having an early transfer start instruction (schedule-up request) is transferred to the print device.

Figure 12:
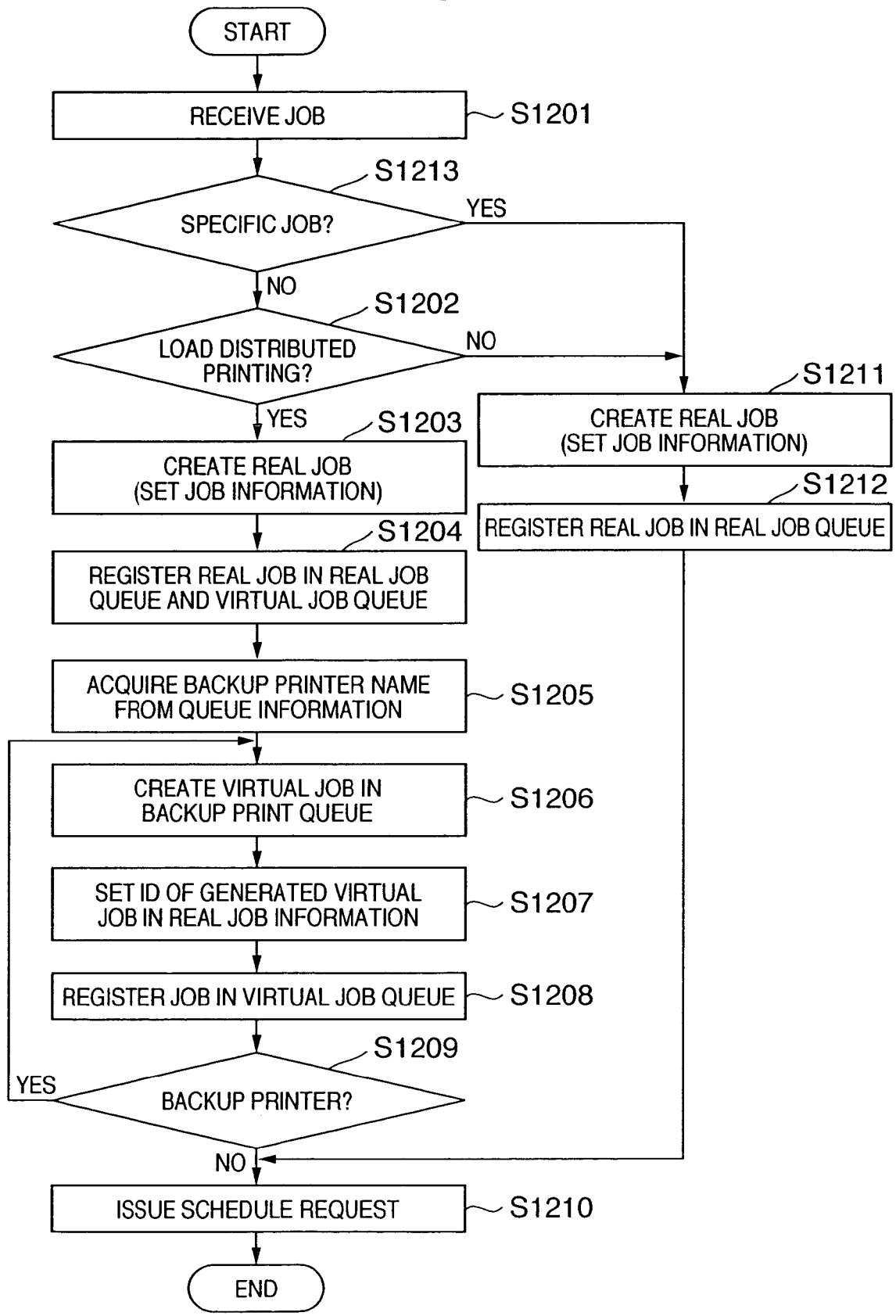
FIG. 12 is a flowchart showing the flow of processing for creating a virtual job upon receiving a print job.

FIG. 12 is a flowchart showing processing from job reception processing to virtual job creation in the load distributed print processing of this embodiment.

Figure 13:
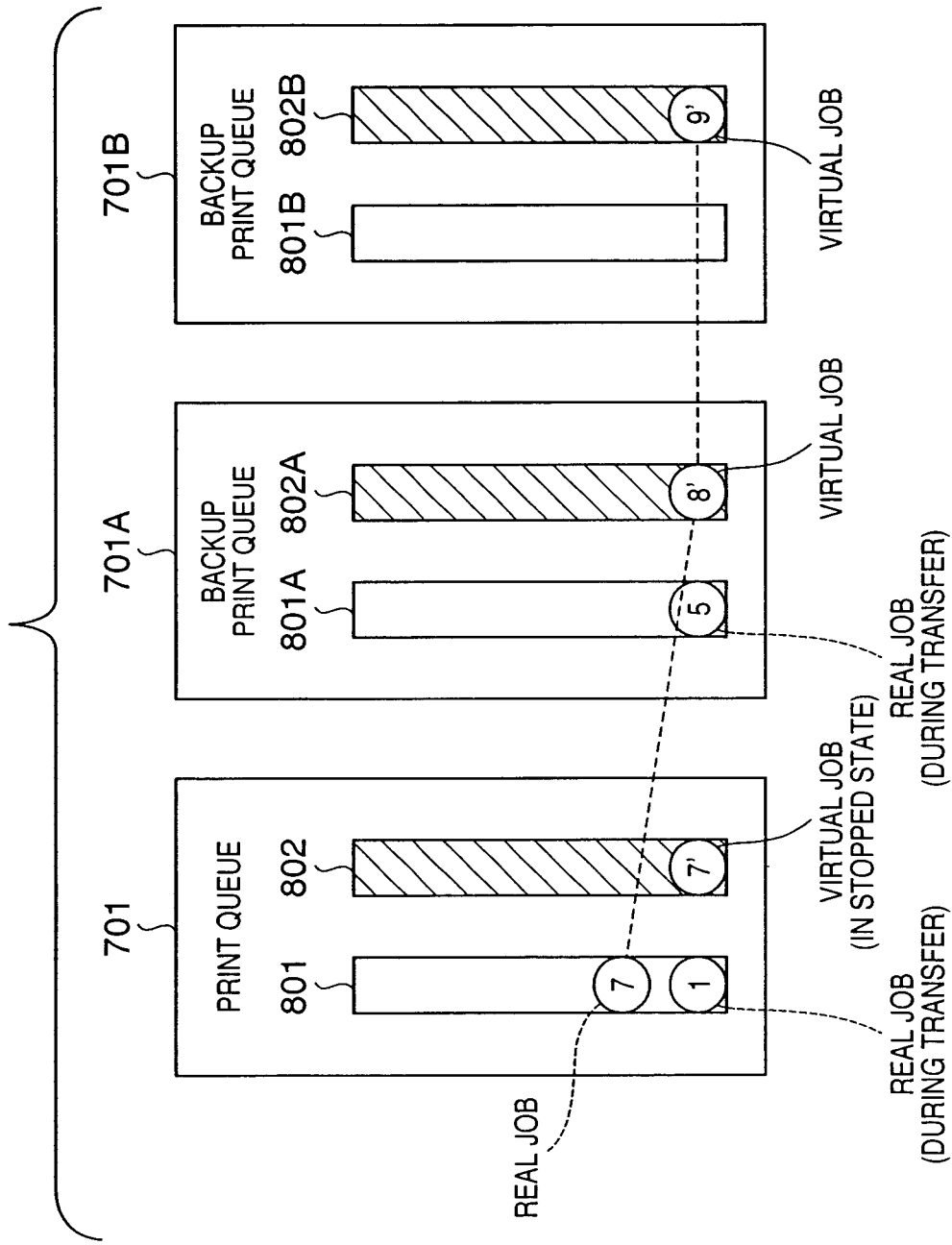
FIG. 13 is a view showing the relation between the real job and virtual job and the real job queue, virtual job queue, print queue, and backup print queue.

FIG. 13 is a view for explaining the processing in the flowchart shown in FIG. 12. Print job information having a job ID "N" is expressed as print job information N. Referring to FIG. 13, real job information 1 is present in the real job queue 801 in the print queue 701. Real job information 5 is present in a real job queue 801A in the backup print queue 701A corresponding to another print device. A description will be made assuming that print data corresponding to each set of real job information is being transferred to print devices. The real job information 5 can be regarded as information which is registered, e.g., when a load distributed print instruction is input for a print job issued from another client by setting the print device corresponding to the backup print queue 701A as the basic print device. In this case, other print queues such as the print queues 701 and 701B are used as backup print queues. Virtual job information is registered in the virtual job queue in each backup print queue.

When the application 601 starts printing, in step S1201, the print queue 701 receives a print job through the spooler 603 and job control port monitor 604.

Next, in step S1213, the type of print job is determined. It is determined on the basis of the execution type in the real job information whether virtual job information is to be created. If the print job can be received only by a specific print device, i.e., if the print job is a password input job which inhibits printing unless a password is input in the network printers 102 to 104, a secure job which is encrypted and can be printed only by a specific one of the network printers 102 to 104, an offline job which sets an offline state immediately before output by the print device, or a save job which is saved in the HD of the print device, the processing advances to step S1211. Otherwise, the processing advances to step S1202. With the processing in step S1213, a print job whose print output is permitted in a predetermined amount by a predetermined print device in consideration of security can be prevented from being output by another print device or duplicated in output pages.

In step S1202, it is confirmed by referring to the print type in the print queue information shown in FIG. 9 whether the processing is load distributed printing. If YES in step S1202, the processing advances to step S1203. If NO in step S1202, the processing advances to step S1211. In step S1203, of the plurality of print queues, a print queue corresponding to the print device set as a first print job output target is set as the basic print queue. The real job information of the received print job is registered in the real job queue contained in the basic print queue.

As the document name, the name acquired when the job is received from the spooler 603 is set. The job ID is generated and set in creating the job information. As the print type, the information of print type in the print queue information is set.

In this embodiment, the print type in the print queue information is load distributed printing. Hence, load distributed printing is set as the print type in the real job information. In step S1204, the created real job information is registered in the real job queue 801 in the print queue 701 (real job information 7 shown in FIG. 13). In addition, virtual job information corresponding to the real job information is registered in a stopped state in the virtual job queue 802 (virtual job information 7' shown in FIG. 13). The stopped state is a status indicating that the virtual job information is not the output target. While a real job is present in the printer 701, virtual job information in the virtual job queue of the same printer is registered in the stopped state to suppress the virtual job information from being scheduled up. Although not illustrated in FIGS. 10 and 11, the real job information and virtual job information in step S1204 have attributes representing the registration order such as time.

The virtual job information registered in the virtual job queue is held until printing is ended or canceled. Accordingly, the sequence of printing in "redirect on error" printing or job movement when an error occurs is guaranteed. In this print system, the virtual job and real job use identical IDs. However, they may use different IDs by separately holding data to manage the correspondence. In this example, the job ID of virtual job information is expressed as N' ("N prime"). That is, for example, real job 9 and virtual job 9' correspond to each other.

In step S1205, the backup printer name in the print queue information shown in FIG. 9 is acquired. If a plurality of backup printers are set, a plurality of backup printer names are acquired. Print queues corresponding to the backup printer names are set as backup print queues.

In step S1206, virtual job information is created in the order of backup print queues specified from the plurality of acquired backup printer names, and each information is set.

Of the items of the virtual job information shown in FIG. 11, the document name is set by acquiring information from the document name in the real job information. The job ID 1102 of the virtual job is generated and set in creating the virtual job information. The print type 1103 is acquired from the information of the print type in the real job information and set. The job ID 1104 of the real job is acquired from the job ID 1102 of the real job information and set.

In step S1207, the job ID of the virtual job information is set as the virtual job ID in the real job information. Since a plurality of virtual jobs may be generated, virtual job ID 1, virtual job ID 2, . . . are set in the order of virtual job creation.

In step S1208, the virtual job information is registered in a virtual job queue 802A (virtual job information 8' shown in FIG. 13). Although not illustrated in FIG. 11, the virtual job information registered in step S1208 has an attribute representing the registration order such as time.

If it is determined in step S1209 that a backup printer name (backup print queue) acquired in step S1205 still remains, the processing returns to step S1206. The processing in steps S1206 to S1208 is repeated. As a result, virtual job information 9' shown in FIG. 13 is registered.

Referring to FIG. 13, it is assumed that two backup printer names are acquired in step S1205. Hence, two pieces of virtual job information are created. More specifically, pieces of virtual job information 8' and 9' are created in the virtual job queues 802A and 802B, and "8'" and "9'" are set in the virtual job ID fields of real job information 7. In addition, "7" is set in the real job ID fields of the pieces of virtual job information with job IDs "8'" and "9'". In this embodiment, real job information and corresponding virtual job information which are present in the same print queue are assigned identical IDs. For this reason, in real job information 7, the job ID (7') of the virtual job in the virtual job queue 802 corresponding to the real job information need not be set. This is because real job information 7 can easily find virtual job information 7' by referring to its own ID.

If NO in step S1209, the processing advances to step S1210 to issue schedule requests of the created real job and all virtual jobs.

Figure 14:
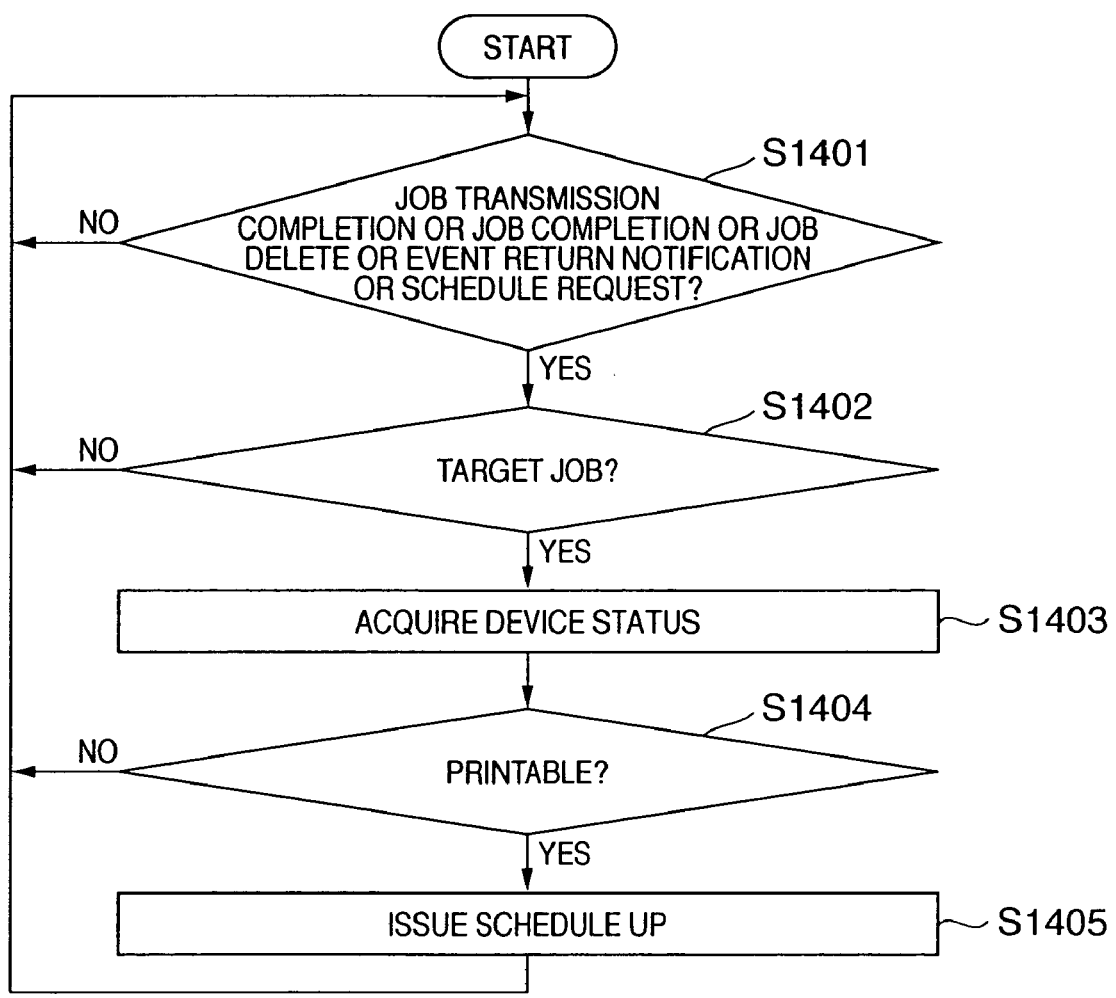
FIG. 14 is a flowchart showing processing of schedule up.

FIG. 14 is a flowchart showing schedule processing for actions issued in the print queues 701, 701A, and 701B. This processing corresponds to processing in the job control print service 605.

In step S1401, the schedule of each print queue is managed, and occurrence of an action is recognized. This recognition may be performed by detecting an external event or polling the action occurrence source and detecting the response. More specifically, actions such as a schedule request from a module (e.g., a job control port monitor) which has registered a print job in a print queue, print job transmission completion (information representing the end of print data transmission from an output port to a print device), print job delete, print job completion (last page output notification), device return notification (e.g., an event representing that an inoperable state has returned to an operable state when a power-off state has changed to a power-on state), and the like are monitored. When an action occurs for a print queue, the processing advances to step S1402. If no action occurs, standby processing is executed in step S1401. A schedule request action is generated from, e.g., a job control port monitor. A print job delete is generated from the print manager 609. A print job transmission completion or print job completion is generated from a print device and notified through an output port. However, the action generation routes are not limited to those described above.

In step S1402, the print queue 701, 701A, or 701B for which the action has occurred is confirmed. The real job queues 801, 801A, 801B, and virtual job queues 802, 802A, and 802B are searched in this order. If print job information is present in a print queue the processing advances to step S1403. If no print job information is present, the processing returns to step S1401. In searching the jobs, jobs in the stopped state or deleted state are excluded from the schedule-up targets.

In step S1403, of the print devices, the operation status of a print device corresponding to the print queue for which a predetermined action has occurred in step S1401 is acquired. For example, if the action which has occurred in step S1401 is job completion, the status is acquired in accordance with a print job completion action.

In device status acquisition in step S1403, polling through the device information control module 606 may be executed. When both polling and device status acquisition according to occurrence of a predetermined action are used, it can more quickly be checked whether the print device has a transferable operation status.

In step S1404, it is determined on the basis of the status acquired in step S1403 whether print data can be transferred to the print device corresponding to the current target print queue. Examples of operation statuses which are determined as data transfer disable states are (1) a state wherein expendables such as paper and toner run short or out, (2) a state wherein an error such as jam (paper jam) which inhibits continuation of image printing has occurred, (3) a state wherein the channel to transmit print data is in an offline state, and (4) a state wherein the print device side (including a network board) is busy because of shortage of the reception buffer capacity. The statuses (1) to (4) may arbitrarily be combined, and the combined status may be determined as a data transfer disable state.

If it is determined in step S1404 that print data can be transferred to the print device as the action generation target, the processing advances to step S1405. If NO in step S1404, the processing returns to step S1401.

In step S1405, a schedule-up request is issued to the job detected in step S1402. The processing returns to step S1401. At this time, if a real job is detected, a schedule-up request is issued to the real job earlier than a virtual job. That is, higher priority is given to a real job than a virtual job independently of the registration order. In addition, real jobs and virtual jobs are preferentially recognized in step S1402 in chronological order of registration in the print queues.

For example, assume that when a schedule request for a print job B is generated in step S1401, a preceding print job (print job A) is being transferred. In this case, NO in step S1404, and the processing returns to step S1401 to set the standby state. After that, when a job transmission completion or job delete of print job A is received in step S1401, the processing advances for step S1402 to step S1405 to immediately start transferring job B.

Figure 15:
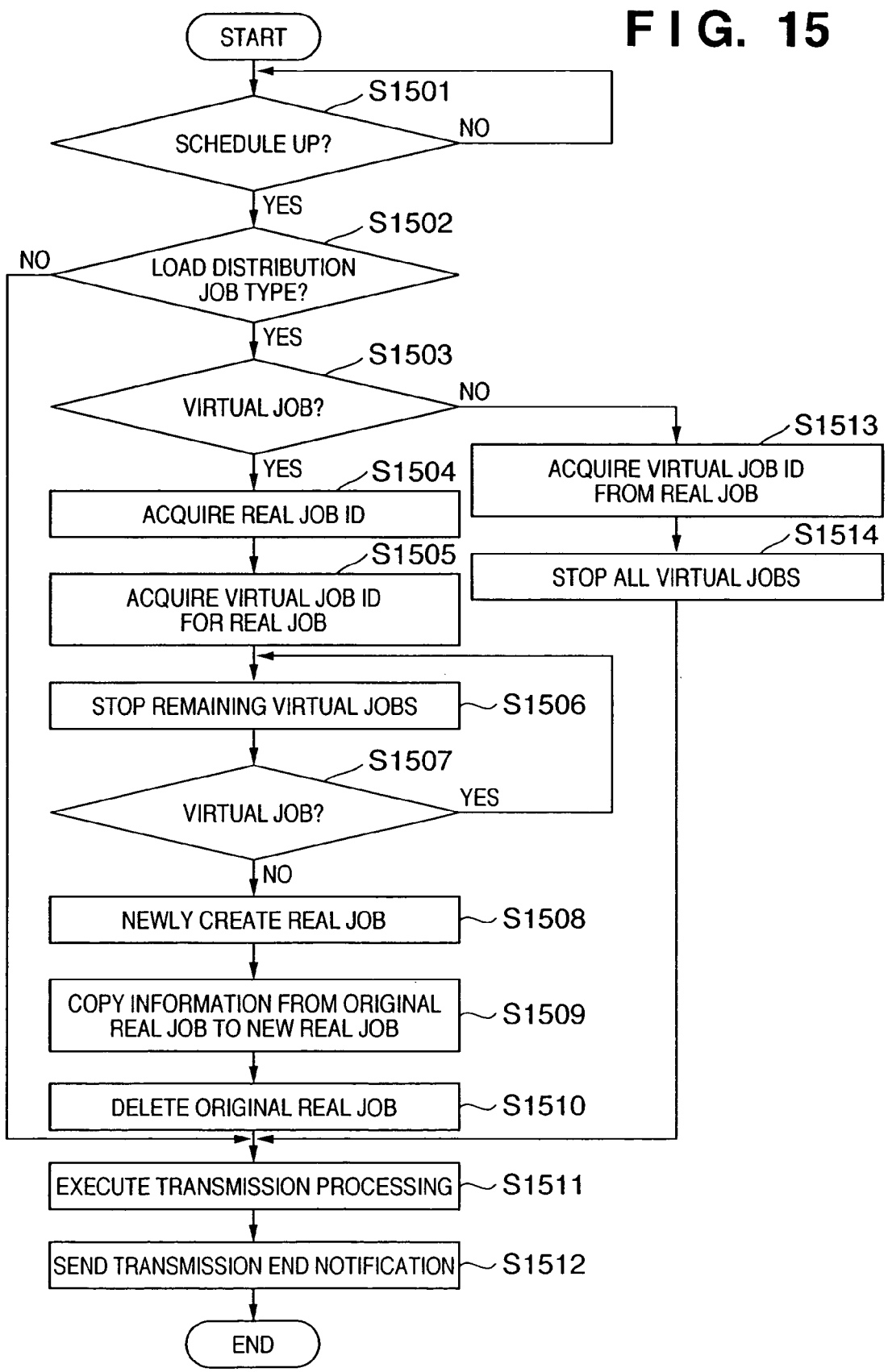
FIG. 15 is a flowchart showing processing from schedule up to printing.
Figure 16:
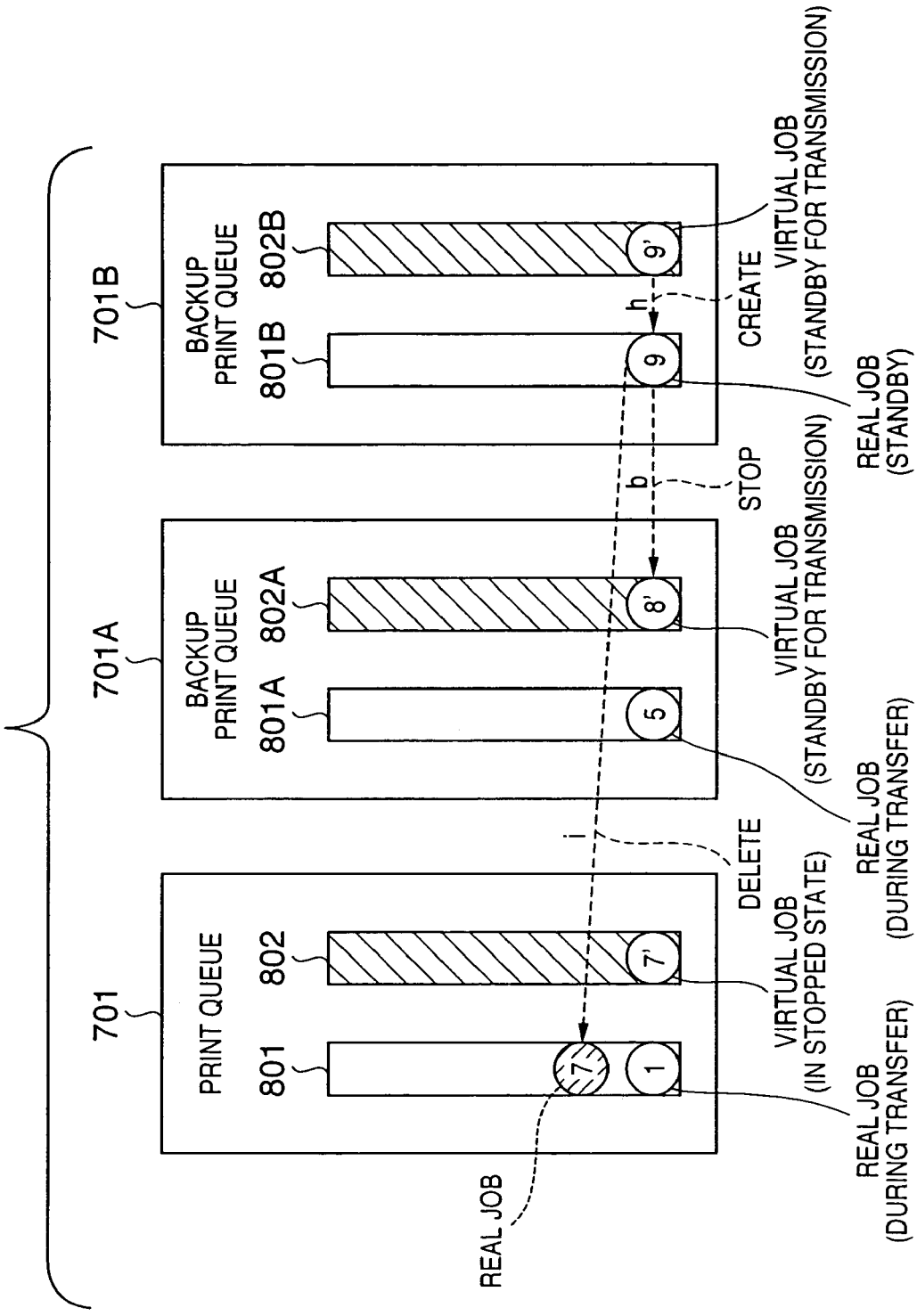
FIG. 16 is a view showing the relation between the real job and virtual job and the real job queue, virtual job queue, print queue, and backup print queue.

The flow of processing after schedule up request reception by the print queue 701 to print data transmission to the print device will especially be described on the basis of the processing of the flowchart shown in FIG. 14. FIG. 15 is a flowchart showing load distributed print processing in the print queue 701. FIGS. 16 and 17 are views showing processing related to the flowchart shown in FIG. 15.

In load distributed printing, real job information is registered in the real job queue of a print queue corresponding to a print device which has received a print instruction. Virtual job information is registered in the virtual job queue of a print queue corresponding to a print device which is preset to operate as a backup print device. Of the jobs in one print queue, a print job which has received a schedule-up request at the earliest timing is transferred to the network printers 102 to 104.

In step S1501, it is determined whether a schedule-up request is received. If YES in step S1501, the processing advances to step S1502. If NO in step S1501, a standby state is set in step S1501.

In step S1502, it is determined whether the print job which has received the schedule-up request is a load distribution job. The print type information in the job information is acquired. If the print type is load distributed printing, the processing advances to step S1503. If NO in step S1502, the processing advances to step S1511 to specify print data on the basis of the storage location (link information) contained in the real job information registered in the real job queue and transfer a print job containing the specified print data to a network printer.

In step S1503, it is determined whether the job to be scheduled up is a virtual job or a real job. If the job is a virtual job, the processing advances to step S1504. If the job is a real job, the processing advances to step S1513.

The user may be notified of the scheduling up of the virtual job. More specifically, when the user is notified that printing is executed not by the basic print device designated by him/her but by a backup print device, he/she can specify the printer which outputs the printing result, resulting in improved convenience.

In step S1504, the real job ID in the virtual job information is acquired to refer to the real job information. In step S1505, the real job information is referred to by using the real job ID acquired in step S1504, and one or a plurality of virtual job IDs contained in the real job information are acquired.

In step S1506, virtual jobs except the virtual job for which the schedule-up request has been generated are recognized on the basis of the virtual job IDs acquired in step S1505. The status of the remaining virtual jobs which have not received the schedule-up request and not transmitted is changed to "stop" (arrow g in FIG. 16). Accordingly, the remaining virtual jobs which are not transmitted are excluded from the subsequent output targets (schedule-up targets) until the status is changed again to "standby for transmission".

In step S1507, of the virtual jobs acquired in step S1505, if a virtual job which is not stopped in step S1506 remains, the processing returns to step S1506. If no virtual job remains, the processing advances to step S1508. With this processing, all the remaining virtual jobs associated with the same real job ID as the virtual job which has received the schedule-up request are "stopped".

In steps S1508 and S1509, to generate a real job from the virtual job and transmit the real job to the print device, the virtual job for which the schedule-up request has been generated is changed to a real job. More specifically, real job information is created from the virtual job information and registered in the real job queue 801B (arrow h in FIG. 16). By this change processing, the virtual job information changes to real job information. The print job corresponding to the real job information before change is not transmitted.

First, in step S1508, new real job information corresponding to the virtual job information is generated in the real job queue 801B (arrow h in FIG. 16). At this time, the virtual job information changed to real job information is set in the stopped state (9' in FIG. 17). In step S1509, the original real job information (real job information 7 registered in the print queue 701) is specified on the basis of the real job ID in the virtual job information. The contents of the original real job information are acquired and copied to new real job information 9. For example, the print type, execution type, start job mark, transmission printer list, and spool file name and the like shown in FIG. 10 are reflected on the new real job information. As the real job ID of the newly created real job information, the original real job ID (job ID "7") may be used. Alternatively, a new real job ID may be generated. To use a new real job ID, the real job ID contained in the associated virtual job information must be rewritten.

In step S1510, the original real job (real job information 7 registered in the print queue 701) registered in the real job ID in the virtual job information for which the schedule up request has been generated is deleted (arrow i in FIG. 16). As a result of these processing operations, the state shown in FIG. 17 is obtained. FIG. 17 shows only one piece of virtual job information in each print queue. Actually, a plurality of pieces of virtual job information may be registered in each print queue in accordance with print requests from a plurality of clients. Even in this case, virtual job information in the stopped state is excluded from schedule up targets. Pieces of backup job information as schedule up targets except the non-targets are scheduled up in the order of registration.

For example, assume that real job information 5 in the state shown in FIG. 17 has already been output. Even when real job information of another print job is registered in the print queue 701, and pieces of virtual job information are registered in the print queues 701A and 701B, the virtual job information registered in the print queue 701A can be changed to virtual job information, and the print job can be output to the printing apparatus because virtual job information 8' in the stopped state is excluded from the schedule up targets. As described above, the virtual job information in the stopped state is excluded from the schedule up targets while maintaining its order of registration. Accordingly, even when the virtual job information is changed to real job information, the order of registration can be maintained. In addition, schedule up of remaining pieces of virtual job information registered subsequently is not impeded.

Referring back to FIG. 15, in step S1511, the print job which has been a real job before or the print job which has been changed to a real job is transferred to a corresponding print device. This will be described in more detail. Print data having a spool file name specified from the real job information (real job information determined as NO in step S1503 or real job information switched in step S1509) shown in FIG. 10, which is an ultimate target, is transferred on the basis of the IP address associated with the output port of the logical printer corresponding to the real job queue (print queue) in which the real job information is registered or the name to be used in name solution.

When print job transfer is ended, a job transmission end notification is sent in step S1512. This notification is confirmed as a job transmission completion action in step S1401 in FIG. 14.

Until the processing indicated by arrow i in FIG. 16 is ended, two real jobs are present. However, when the processing from arrow g to arrow i in FIG. 16 is implemented by a unicursal program (a program which generates no context change), no problem rises. The order of processing operations indicated by arrows i and h may be reversed. In the above description, unnecessary virtual job information and real job information are deleted. For example, unnecessary virtual job information may have a flag representing that fact added to it, and the job information with the added flag may be transmitted to a corresponding print device. Then, the flag may be referred to, and the received print job information may be discarded on the printer side.

If, of the real job and the plurality of virtual jobs generated by load distributed processing, the job which has received the schedule up is the real job, the processing advances from step S1503 to step S1513. In step S1513, all pieces of virtual job information are acquired from the real job information. In step S1514, all pieces of virtual job information are stopped. In step S1511, the real job which has received the schedule up is transferred to the corresponding network printer.

If it is determined in step S1502 that the print type of the print job which has received the schedule up is not load distributed printing, the processing advances to step S1511 to transfer the print job to the network printer.

Various print job transfer methods can be used. A spool job may be transferred to a uniquely created transmission output port. Alternatively, a print job may be transferred to a transmission output port prepared in the operating system.

Figure 20:
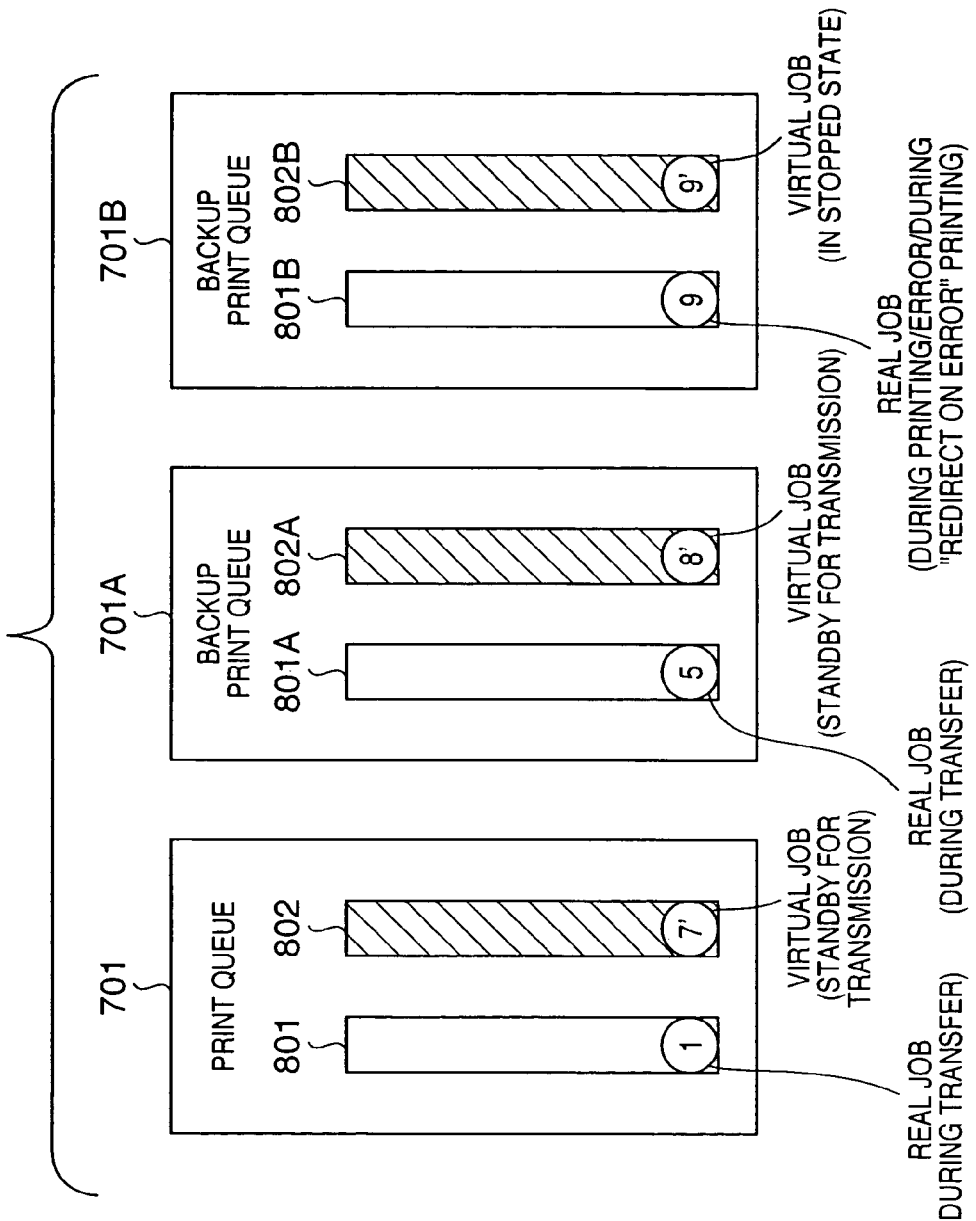
FIG. 20 is a view for explaining a print job processing method for when interruption of printing has occurred in a print device.

In the state shown in FIG. 20, pieces of backup print job information as schedule up targets except backup print job information excluded from the schedule up targets are scheduled up in the order of registration.

FIG. 18 shows a setting window to make a logical printer corresponding to a backup print queue associate with a logical printer corresponding to the basic print queue. The window shown in FIG. 18 is displayed to create or add a new logical printer. The window may be displayed to change setting of an already created logical printer.

A printer name is input to an input field 1801. The user can arbitrarily designate the name through the keyboard. The printer name input to this field corresponds to a print device as the first output target in step S1203 in FIG. 12.

A printer driver name is displayed in a display field 1802. When a "select driver" button is selected, the list of a plurality of printer drivers which can be selected by the user is displayed. The name of a printer driver selected from the list is displayed in the display field 1802.

A "select port" button 1806 is used to display a select window on which a port to be associated with the printer driver is selected. When the "select port" button 1806 is selected, a plurality of ports registered in the system are presented in a selectable form.

In a select field 1803 the output method of the printer is selected. In this select field, "load distributed printing" can be designed as the output method.

In a display field 1804, the list of backup printers (the backup printers correspond to, e.g., the backup print queues 701A and 701B in FIG. 13) corresponding to the logical printer set in the fields 1801 and 1806 is displayed. A "set backup printer" button 1805 is used to set a backup printer. When the "set backup printer" button 1805 is selected, the list of printers which can be set as a backup printer is displayed. A printer selected from the list is set as a backup printer and displayed in the backup printer list display field 1804. When the "set backup printer" button 1805 is selected, only printers which are compatible with the printer model or printer language specified by the designated printer driver may be displayed in the list. In this case, the user can efficiently select an appropriate backup printer. In the "condition for "redirect on error" print" field in "printer options" shown in FIG. 18, a condition for "redirect on error" printing can be designated.

The setting information set on the window shown in FIG. 18 is reflected on the information items shown in FIGS. 9, 10, and 11. That is, the window shown in FIG. 18 apparently serves as a setting window to set the relationship between logical printers. The set contents on the setting window consequently set the relationship between print queues. Hence, the window shown in FIG. 18 can be regarded as a setting window to make backup print queues correspond to the basic print queue.

<Processing in Error Occurrence>

Figure 21:
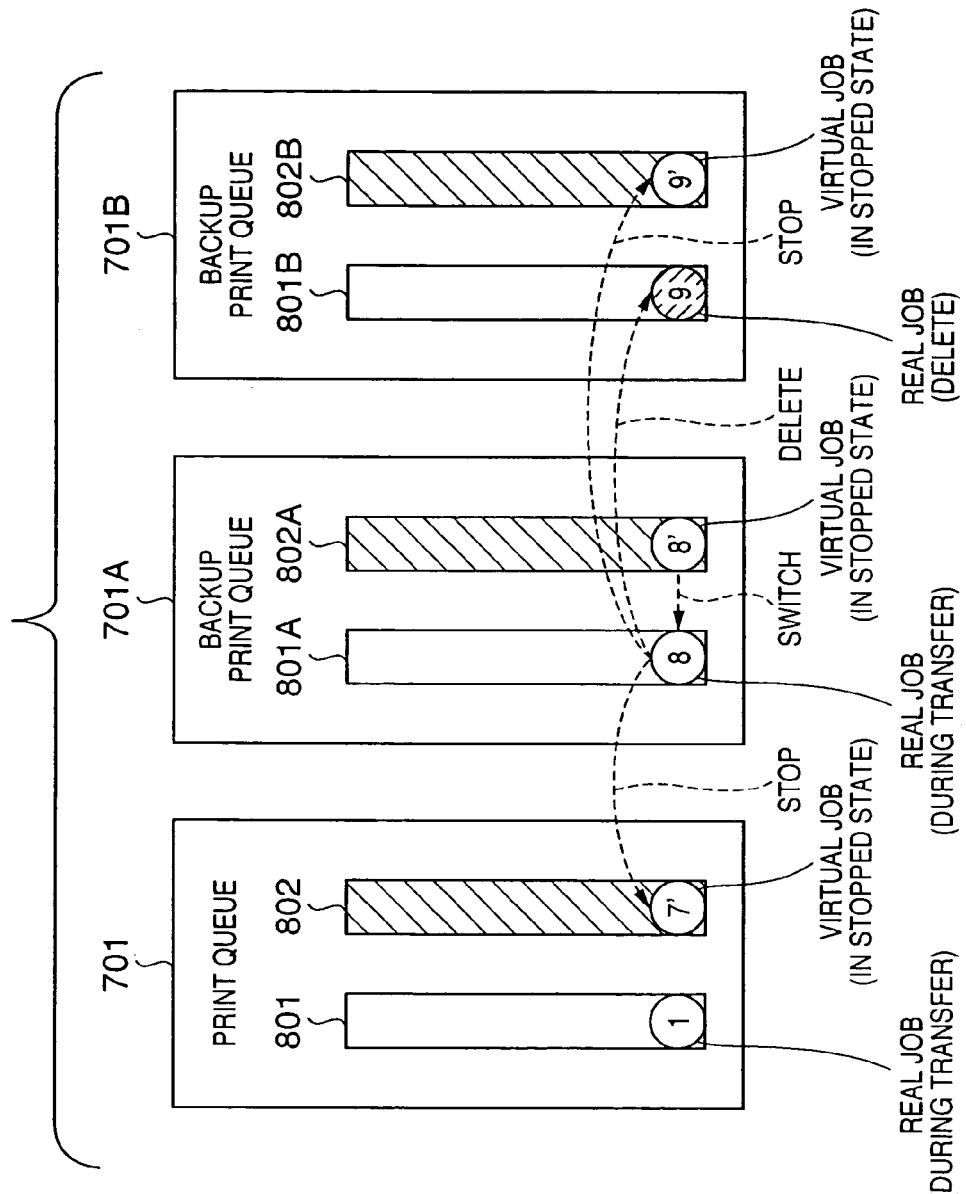
FIG. 21 is a view for explaining a print job processing method for when interruption of printing has occurred in a print device.

Processing when an error has occurred in a print device will be described next with reference to FIGS. 19 to 21.

Figure 19:
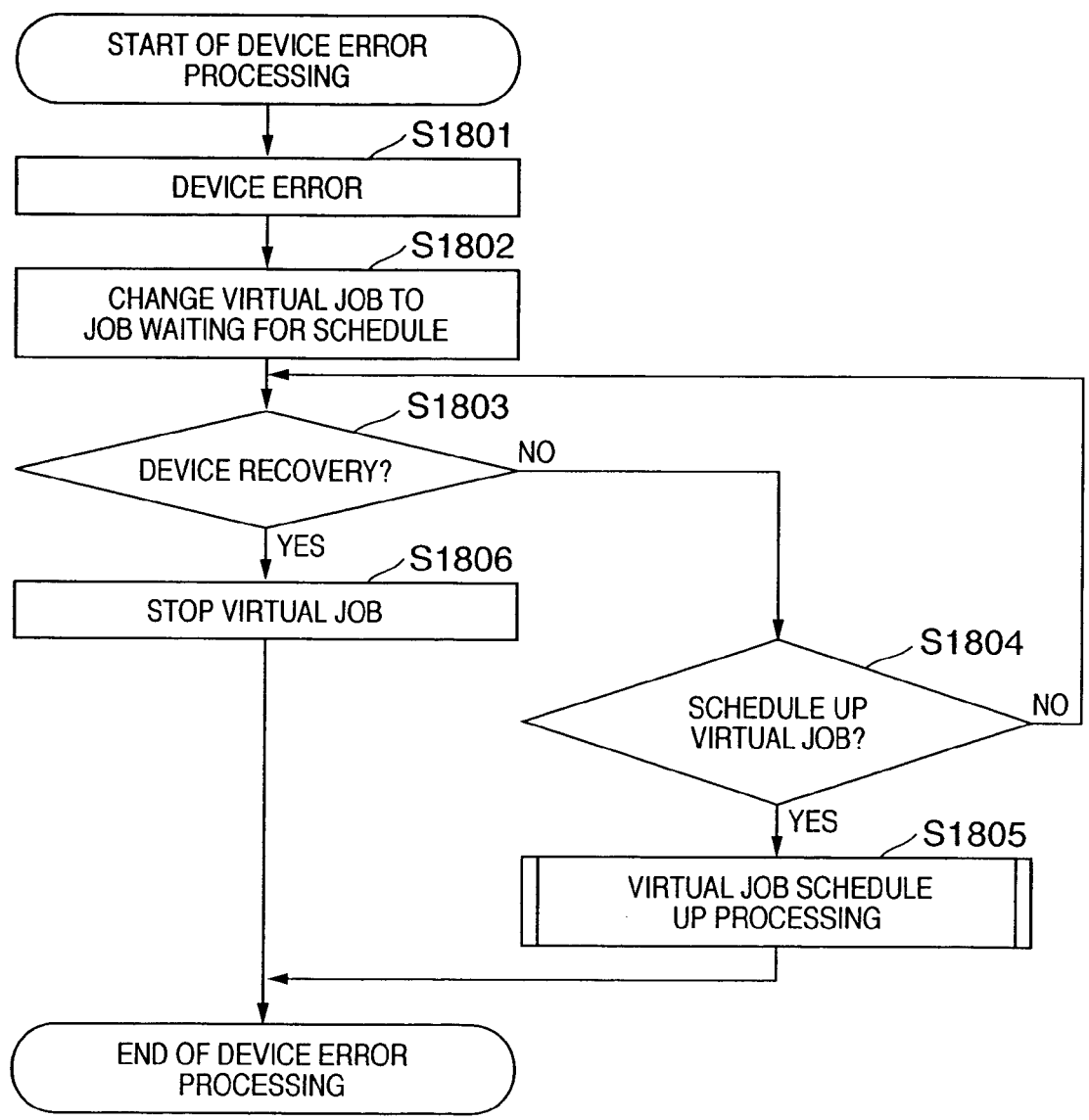
FIG. 19 is a flowchart showing processing when interruption of printing has occurred in a print device after print data transmission to the print device.

FIG. 19 is a flowchart showing processing in a print queue when a print disable state has occurred in a print device after print data transmission to the print device. Examples of the print disable state are (1) to (4) described in step S1404. However, the present invention is not limited to this.

In step S1801, it is determined by monitoring the print device whether an error has occurred. When an error has occurred, the processing advances to step S1802. In step S1801, occurrence of an error is assumed. However, the present invention is not limited to this. Various states which inevitably do not allow a print device to print can be applied as conditions to advance to step S1802. In the following description, occurrence of an "error" will be exemplified.

In step S1802, real job information in the print queue corresponding to the print device with the error is set in a "redirect on error" printing state. By referring to the virtual job ID contained in the real job information, the stopped state of virtual job information corresponding to the virtual job ID is canceled (referring to FIG. 20, when real job information 9 is set in the "redirect on error" printing state, pieces of virtual job information 7' and 8' are set in a transmission standby state).

Recovery of the print device or scheduling up at the "redirect on error" printing destination is waited. Return of the print device can be known by recognizing the device return notification described in step S1401.

If it is determined in step S1803 that the print device has not recovered yet, and one of the pieces of virtual job information 7' and 8' is scheduled up in step S1804, the processing advances to step S1805 to schedule up the virtual job information and delete real job information 9. This processing is basically the same as the processing in steps S1504 to S1511 in FIG. 15. FIG. 21 is a view showing a state in which virtual job information 8' is scheduled up, and real job information 9 is deleted. At the same time, remaining pieces of corresponding virtual job information (the pieces of virtual job information 7' and 9' in FIG. 21) are set in the stopped state. As in step S1508, virtual job information 8' corresponding to real job information 8 is set in the stopped state.

If recovery of the print device is detected in step S1803 earlier than schedule up of the virtual job, all virtual jobs are returned to the stopped state, and print processing of the real job information is continued. The state of the print queue at this time is the same as that shown in FIG. 17.

When the end of print output (job completion) in the print device is detected by the information processing apparatus by the processing in step S1401, all the corresponding virtual jobs are deleted together with the real job information, and the print processing is ended.

As described above, in this embodiment, when an application sends a print instruction to a load distributed printer, real job information and virtual job information are created in the basic print queue of load distribution setting, and virtual job information is registered in each backup print queue. Of these pieces of job information, job information which has received a schedule up at the earliest timing is transferred to a print device as a print job. Accordingly, the print job is transferred to, of a plurality of print devices, a print device which is set in a transferable state at the earliest timing. As a result, a number of print jobs can efficiently be processed by the plurality of print devices. While print jobs are present, the plurality of print devices can be used in full operation.

When interruption of printing has occurred after a print job is transmitted to a print device, the flowchart shown in FIG. 18 is executed. Hence, virtual job information 8' shown in FIG. 21 changes to real job information 8, and "redirect on error" print processing can be executed. Wasteful time for re-execution of the processing from step S1203 in FIG. 12 can be reduced. As a result, "redirect on error" processing can be implemented at an early stage as compared to a case where the processing is re-executed from step S1203.

Even when interruption of printing has occurred, the flowchart shown in FIG. 18 is executed so that "redirect on error" processing is done in accordance with the original job reception order. In other words, the processing need not be re-executed from step S1203 in FIG. 12 at the time of "redirect on error" printing. Even when virtual job information from another client is registered subsequently in the virtual job queue, the virtual job can be scheduled up with higher priority than the remaining pieces of virtual job information. On the other hand, when recovery of the print device delays, the print output can be obtained by using another print device. When the print device recovers quickly, the print job which has been transmitted to the print device in which the interruption of printing has occurred is printed. Hence, efficient printing can be executed.

Second Embodiment

In the first embodiment, real job information and virtual job information are definitely distinguished. However, the present invention is not limited to the first embodiment from the viewpoint of solving the problem of load concentration at a specific printing apparatus by efficiently using a plurality of printing apparatuses to distribute the load, considering a case wherein after a print job is transmitted to a printing apparatus, an error occurs in the printing apparatus.

More specifically, a plurality of print queues corresponding to a plurality of printing apparatuses may be prepared in the information processing apparatus. Job information containing information which can link to print data is registered in each of the plurality of print queues. The pieces of job information other than the job information scheduled up first in accordance with the vacant state of the print queues are excluded from schedule up targets. When interruption of printing has occurred in a printing apparatus which has output a print job based on the job information scheduled up, job information excluded from the schedule up targets is set as a schedule up target. This can be implemented by the software configuration of the print system described in the first embodiment with reference to FIGS. 6A and 6B.

A case wherein three print queues 701, 701A, and 701B as shown in FIG. 13 will be described. First, the same print job information as shown in FIG. 10 is registered in the print queue 701 corresponding to a logical printer designated by the user as load distributed printing. The same print job information (FIG. 22) shown in FIG. 10 is registered in each of the print queues 701A and 701B which are specified by the backup printer names in the print queue information (FIG. 9) in the print queue 701 in which registration is done. In addition, the job IDs of pieces of job information registered in the print queues which are associated with the print queues specified by the backup printer names are also set.

Figure 22:
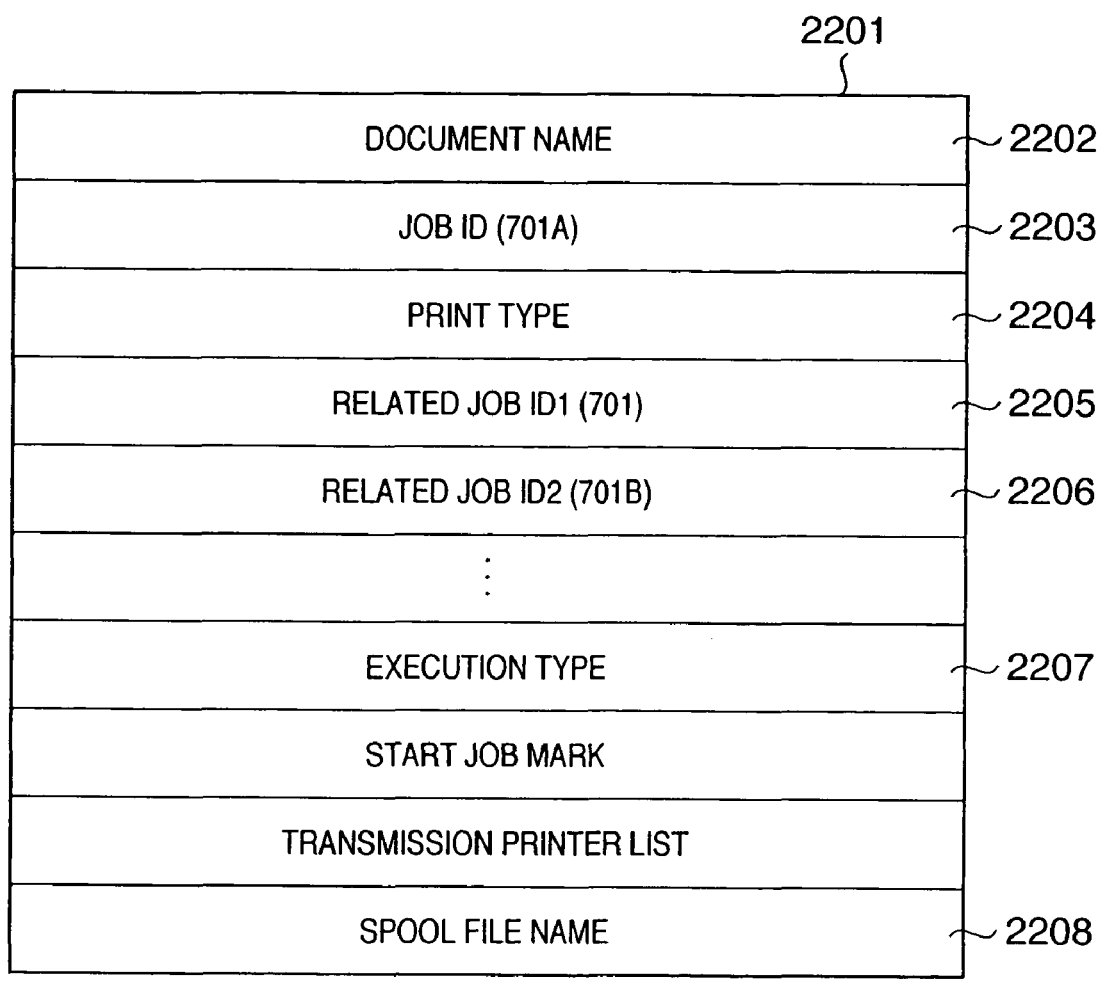
FIG. 22 is a view showing the contents of job information related to print job information registered in a predetermined print queue.

FIG. 22 shows print job information registered in, e.g., print queue 701A. A document name 2202, job ID, print type 2204, execution type 2207, and spool file name are the same as in FIG. 10, and detailed description thereof will be omitted. Job ID 1 (701) and job ID 2 (701B) are set in fields 2205 and 2206 because print queues 701 and 701B are associated with print queue 701A.

Note that in the second embodiment, a backup printer name can be defined as a related printer name. In addition, print job information that has been registered can be defined as job information without being distinguished as real job information versus virtual job information. In each print job information, the job IDs of print jobs registered in associated print queues are set in addition to the print job's own job ID. On the basis of this job information registration, how to execute the flowchart corresponding to FIG. 12 will be described below.

Processing in steps S1201 to S1202 is the same as described with reference to FIG. 12. Print job information received in step S1201 is added an attribute of the registration order such as registration time. Print job information registered in a predetermined print queue is scheduled up in accordance with the registration order.

In step S1204, registration in the real job queue (print queue 701) is performed. Registration in the virtual job queue is omitted. In virtual job information registration in steps S1205 to S1208, print job information is registered in each of print queues (e.g., print queues 701A and 701B) specified by related printer names. Processing in step S1210 is executed for each registered print job information. Even at this time, action occurrence monitoring processing shown in FIG. 14 is executed in parallel.

In step S1402 in FIG. 14, print job information scheduled up in accordance with the order of registration in the print queues is monitored. The processing advances to the flowchart shown in FIG. 15. The following description will be done assuming that, for example, the print job information registered in print queue 701 in step S1201 and job information registered in print queue 701A associated by load distributed printing are scheduled up.

The same processing as described above is executed in steps S1501 and S1502. The processing advances to step S1505. Processing in steps S1503 and S1504 is omitted.

Step S1505 can be replaced with processing for acquiring the job IDs of related print jobs.

In step S1506, the pieces of print job information corresponding to the IDs 2205 and 2206 of the related print jobs acquired in step S1505 are stopped. The pieces of job information other than the job information scheduled up first are excluded from schedule-up targets. As a result, the print jobs based on the print job information registered in print queues 701 and 701B are not output to the printing apparatus.

The processing of the flowchart shown in FIG. 19 of the second embodiment will be described next.

First, when interruption of printing is detected in step S1801, the stopped states of the related job IDs 2205 and 2206 specified in FIG. 22 are canceled to set, as schedule-up targets, the pieces job information excluded from the schedule-up targets.

If it is detected in step S1803 that the print device in which interruption of printing has occurred recovers, the pieces of print job information corresponding to the print job IDs 2205 and 2206 are stopped again. Printing of the print job based on its own print job information is resumed from a predetermined continued page. When the print output after resumption is ended, the plurality of pieces of print job information are deleted.

On the other hand, when it is confirmed that one of the pieces of job information of the related job IDs whose stopped states are canceled is scheduled up, the pieces of print job information of the related job IDs other than its own job ID set in the print job information scheduled up are excluded from the schedule-up targets. When output of the print job based on the print job information scheduled up to the printing apparatus is ended, all pieces of print job information are deleted.

In the above description, the processing of excluding pieces of job information except job information scheduled up from schedule-up targets or setting them again as schedule-up targets in accordance with occurrence of interruption of printing is executed on the basis of the job information shown in FIG. 22. However, the present invention is not limited to this. For example, the processing can also be implemented by executing the mechanism of the first embodiment except the rule that real job information is scheduled up with higher priority than virtual job information.

As described above, even when the same mechanism as in FIGS. 1 to 6 of the first embodiment is used, and the steps in the flowcharts shown in FIGS. 12, 14, 15, and 17 are omitted or changed, by efficiently using a plurality of printing apparatuses to distribute the load, the mechanism for maintaining load distributed printing even when a print job is transmitted to a printing apparatus, and then, an error occurs in the printing apparatus can be implemented.

In addition, without deleting pieces of related print job information, the stopped states of them are set or canceled while maintaining the registration order. Even when printing is interrupted after a print job based on one of the plurality of related sets of print job information is transmitted to a printing apparatus, the printing sequence can be ensured, load distributed printing can be maintained, and "redirect on error" print processing can be achieved.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a separate program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-416617 filed on Dec. 15, 2003, which is incorporated by reference herein.

What is claimed is:

1. An information processing apparatus including a plurality of print queues corresponding to a plurality of printing apparatuses, each of the plurality of print queues including a real job queue and a virtual job queue, comprising:
   a registration unit configured to register as a schedule up target, in the plurality of print queues, job information including information which links to the same print data, wherein the job information as the scheduled up target is registered in the virtual job queues of the plurality of print queues;
   a detection unit configured to detect job information that is scheduled up, registered by the registration unit, wherein the job information that is scheduled up is registered in the real job queue from the virtual job queue of a print queue when the real job queue of the print queue is vacant;
   an error detection unit configured to detect an error of a printing apparatus corresponding to the print queue in which the job information detected by the detection unit is registered; and
   a control unit configured to,
      (i) when the detection unit detects first job information that is scheduled up, exclude, from the schedule up target, all other job information registered by the registration unit than the first job information and retain other job information registered in the print queues, and
      (ii) when the error detection unit detects the error of the printing apparatus corresponding to the print queue in which the first job information is registered, set the other job information registered by the registration unit as the schedule up target again, and
      (iii) when the detection unit detects second job information that is scheduled up before the error corresponding to the first job information is recovered from, exclude, from the schedule up target, all job information registered by the registration unit other than the first and the second job information.

2. The apparatus according to claim 1, further comprising a display unit configured to display job information registered in the real job queues and not to display job information registered in the virtual job queues.

3. The apparatus according to claim 1, wherein the plurality of print queues include a basic print queue corresponding to a printing apparatus and a backup print queue corresponding to other printing apparatus.

4. The apparatus according to claim 1, further comprising a transmission unit configured to transmit a print job corresponding to the job information detected by the detection unit.

5. An information processing method executed in an information processing apparatus including a plurality of print queues corresponding to a plurality of printing apparatuses, each of the plurality of print queues including a real job queue and a virtual job queue, comprising:

a registering step of registering as a schedule up target, in the plurality of print queues, job information including information which links to the same print data, wherein the job information as the scheduled up target is registered in the virtual job queues of the plurality of print queues;

a first detecting step of detecting first job information that is scheduled up, registered in the registering step, wherein the job information that is scheduled up is registered in the real job queue from the virtual job queue of a print queue when the real job queue of the print queue is vacant;

a first controlling step of controlling to exclude, from the schedule up target, all other job information registered in the registration step than the first job information and retain other job registered in the print queues;

an error detecting step of detecting an error of the printing apparatus corresponding to the print queue in which the first job information is registered;

a second controlling step of controlling to set the other job information registered by the registration unit as the schedule up target again;

a second detecting step of detecting second job information that is scheduled up before the error corresponding to the first job information is recovered; and a third controlling step of controlling to exclude, from the schedule up target, all job information registered by the registration unit other than the first and the second job information.

6. The method according to claim 5, further comprising a displaying step of displaying job information registered in the real job queue and not displaying job information registered in the virtual job queue.

7. The method according to claim 5, wherein the plurality of print queues include a basic print queue corresponding to a printing apparatus and a backup print queue corresponding to other printing apparatus.

8. The method according to claim 5, further comprising a transmitting step of transmitting a print job corresponding to the job information that is scheduled up.

9. A non-transitory computer-readable storage medium storing a computer program executed in an information processing apparatus including a plurality of print queues corresponding to a plurality of printing apparatuses, each of the plurality of print queues including a real job queue and a virtual job queue, the computer program causing the information processing apparatus to:

register as a schedule up target, in the plurality of print queues, job information including information which links to the same print data, wherein the job information as the scheduled up target is registered in the virtual job queues of the plurality of print queues;

detect first job information that is scheduled up, wherein the job information that is scheduled up is registered in the real job queue from the virtual job queue of a print queue when the real job queue of the print queue is vacant;

control to exclude, from the schedule up target, all other job information registered in the registration step than the first job information and retain other job registered in the print queues;

detect an error of the printing apparatus corresponding to the print queue in which the first job information is registered;

control to set the other job information registered by the registration unit as the schedule up target again;

detect second job information that is scheduled up, before the error corresponding to the first job information is recovered; and control to exclude, from the schedule up target, all job information registered by the registration unit other than the first and the second job information.

* * * * *